(12) United States Patent
Shahar et al.

(10) Patent No.: US 7,136,557 B2
(45) Date of Patent: Nov. 14, 2006

(54) ALL OPTICAL CHOPPING FOR SHAPING AND RESHAPING APPARATUS AND METHOD

(75) Inventors: Arie Shahar, Rye Brook, NY (US); Eldan Halberthal, Rye Brook, NY (US)

(73) Assignee: Main Street Ventures, LLC, White Plains, NY (US)

( * ) Notice: Subject to any disclaimer, the term of this patent is extended or adjusted under 35 U.S.C. 154(b) by 269 days.

(21) Appl. No.: 10/826,363

(22) Filed: Apr. 19, 2004

(65) Prior Publication Data

US 2004/0213506 A1    Oct. 28, 2004

Related U.S. Application Data

(63) Continuation-in-part of application No. 10/813,108, filed on Mar. 31, 2004, now Pat. No. 6,990,281, and a continuation-in-part of application No. 10/640,040, filed on Aug. 14, 2003, now Pat. No. 6,956,998, and a continuation-in-part of application No. 10/640,035, filed on Aug. 14, 2003, and a continuation-in-part of application No. 10/640,018, filed on Aug. 14, 2003, and a continuation-in-part of application No. 10/640,017, filed on Aug. 14, 2003.

(60) Provisional application No. 60/464,351, filed on Apr. 22, 2003, provisional application No. 60/461,796, filed on Apr. 11, 2003, provisional application No. 60/405,697, filed on Aug. 22, 2002, provisional application No. 10/404,077, filed on Apr. 2, 2003, provisional application No. 10/404,140, filed on Apr. 2, 2003.

(51) Int. Cl.
*G02B 6/00* (2006.01)
*H04B 10/12* (2006.01)

(52) U.S. Cl. .................. 385/122; 385/39; 385/42; 385/24; 385/15; 385/140; 385/14; 359/333; 359/341.1

(58) Field of Classification Search ............ 385/14, 385/16, 17, 129, 130, 131, 132, 147, 122, 385/42, 39, 15, 24, 140; 359/333, 341.1, 359/341.2, 108
See application file for complete search history.

(56) References Cited

U.S. PATENT DOCUMENTS

| | | | | |
|---|---|---|---|---|
| 4,382,660 | A * | 5/1983 | Pratt et al. | 359/244 |
| 4,738,503 | A * | 4/1988 | Desurvire et al. | 385/30 |
| 5,146,517 | A * | 9/1992 | Avramopoulos et al. | 385/39 |
| 5,880,866 | A * | 3/1999 | Stolen | 398/101 |
| 6,859,307 | B1 * | 2/2005 | Takeda et al. | 359/337 |
| 6,990,281 | B1 * | 1/2006 | Shahar et al. | 385/122 |

* cited by examiner

*Primary Examiner*—Brian M. Healy
(74) *Attorney, Agent, or Firm*—Pearl Cohen Zedek Latzer LLP

(57) ABSTRACT

The present invention relates to all optical choppers for shaping and reshaping. A chopper according to some embodiments of the invention may include a threshold device having an input terminal for receiving an optical input signal and an output terminal for emitting an optical output signal in response to a part of the input signal having intensity above a threshold level of the chopping device, wherein the output signal is narrower than the input signal. In other embodiments the device may include a first splitting device having at least first, second and third terminals, and at least one nonlinear element, wherein the second and third terminals form an optical loop including at least one nonlinear element displaced from the center of the optical loop, wherein the splitting device is arranged to receive an input signal for producing a first output signal that is narrower than the input signal. In further embodiments the optical loop includes at least one more attenuator.

34 Claims, 17 Drawing Sheets

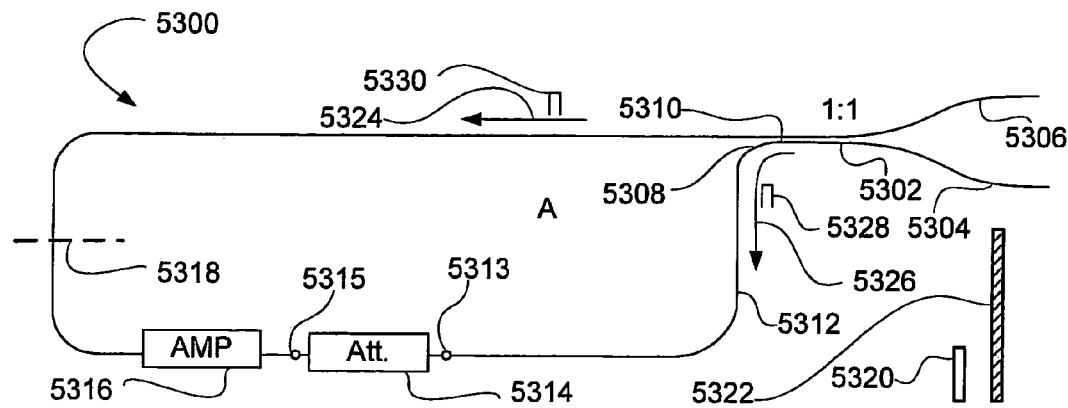
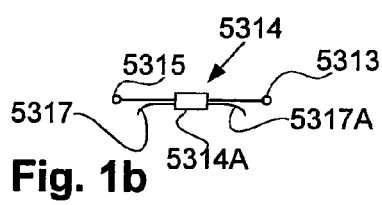
Fig. 1a
Fig. 1b
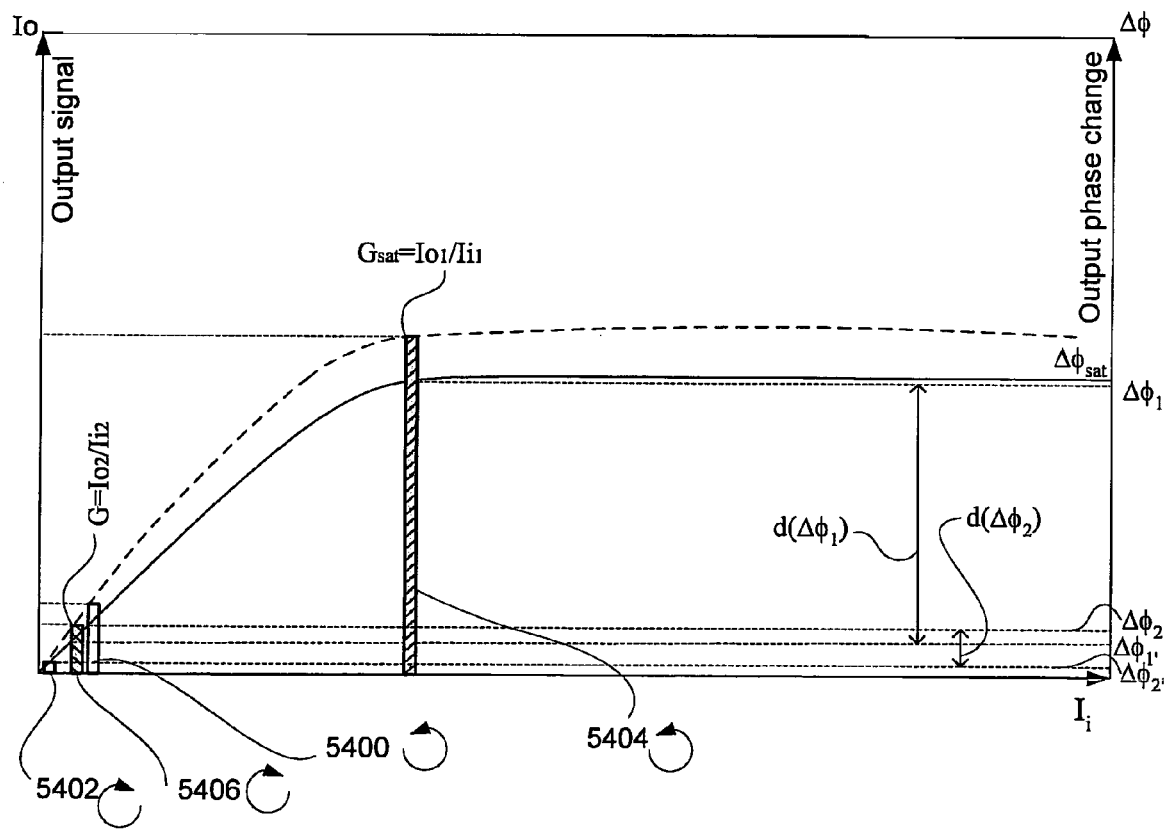
Fig. 2

$\Delta S = \Delta T / 2 \cdot C / n$ $\Delta S = \Delta T / 2 \cdot C / n$

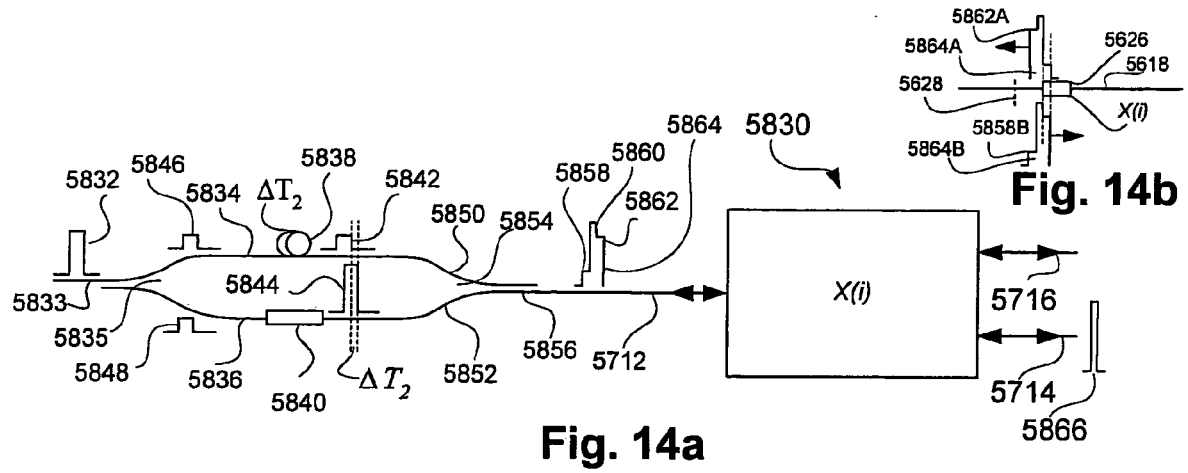
Fig. 14a
Fig. 14b
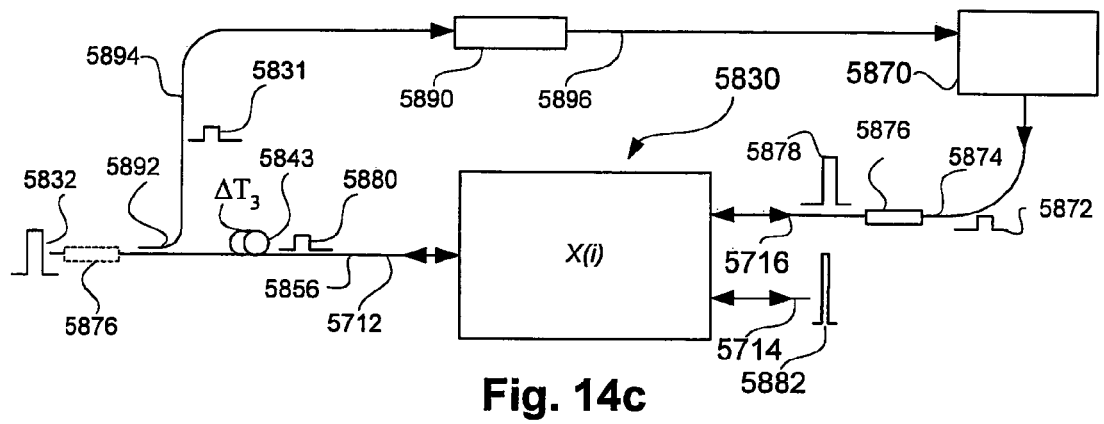
Fig. 14c
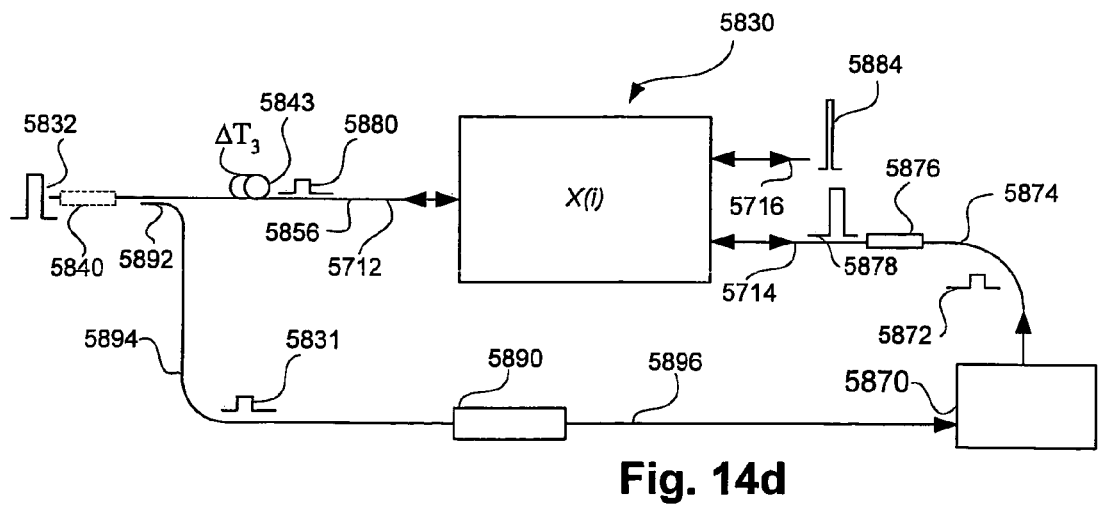
Fig. 14d

ALL OPTICAL CHOPPING FOR SHAPING AND RESHAPING APPARATUS AND METHOD

CROSS-REFERENCE TO RELATED APPLICATION

The present invention claims the benefit of U.S. Provisional Patent Application Ser. No. 60/464,351(now expired), filed Apr. 22, 2003, entitled "All Optical Chopping for Shaping and Reshaping Apparatus and Method".

In addition, this application is a Continuation-In-Part of U.S. patent applications Ser. Nos. 10/640,035; 10/640,018; 10/640,017 and 10/640,040 (now U.S. Pat. No. 6,956,998) filed Aug. 14, 2003 now U.S. Pat. No. 6,956,998, entitled "All Optical Decoding Systems For Decoding Optical Encoded Data Symbols Across Multiple Decoding Layers", "All Optical Decoding Systems For Optical Encoded Data Symbols", "All Optical Cross Routing Using Decoding Systems For Optical Encoded Data Symbols" and "Compact Optical Delay Lines", respectively, all of which claim the benefit of U.S. Provisional Patent Application Ser. No. 60/405,697(now expired), filed Aug. 22, 2002, entitled "Streaming Signal Control System for Digital Communication".

In addition this application is a Continuation In Part of U.S. patent application Ser. No. 10/813,108, now U.S. Pat. No. 6,990,281, filed Mar. 31, 2004 entitled "All Optical Logic Gates", now U.S. Pat. No. 6,990,281, which claims the benefit of U.S. Provisional Patent Application Ser. No. 60/461,796(now expired), filed Apr. 11, 2003, and of U.S. patent application Ser. Nos. 10/404,077 (now U.S. Pat. No. 6,892,016) and 10/404,140 (now U.S. Pat. No. 6,795,626), both filed Apr. 2, 2003 and entitled "Optical Threshold Devices and Methods".

FIELD OF INVENTION

The invention relates to optical shaping, optical reshaping, optical communication devices and systems, in particularly to optical shapers and choppers.

BACKGROUND OF THE INVENTION

In the field of optical communication there is a strong demand for optical shaping, reshaping, and chopping of optical signals to perform transmission of optical information at a very high quality and very low Bit Error Rate (BER).

The implementation of ultra fast optical communication network faces, among other challenges, two major obstacles. The first is the need to produce very fast modulators and the second is to maintain high quality optical signals along significant distances to keep very low BER.

To produce the signals, at a very fast rate, there is a need for very fast modulators that are capable of producing very narrow optical pulses. Fast modulators are very expensive and there are only few types of modulators capable of producing narrow optical pulses suitable for use in extremely fast rate.

At high transmission rate, the pulse quality of the optical pulses degrades very fast in a relatively short distance due to pulse broadening caused by chromatic and polarization-mode dispersions. Accordingly, many Optical-Electrical-Optical (O-E-O) regenerators should be distributed along the propagation path. O-E-O regenerators are very expensive and complicated and thus dramatically increase the network cost in terms of infrastructure initial cost and maintenance cost. In addition the O-E-O regenerators reduce the network reliability.

SUMMARY OF THE INVENTION

It is an object of embodiments of the present invention to provide an all optical pulse chopper capable of producing narrow pulses.

Another object of embodiments the present invention is to provide an all optical pulse chopper operating by self-chopping.

Another object of embodiments of the present invention is to provide an all optical pulse chopper that is capable of producing variable amounts of chopping.

Another object of embodiments the present invention is to provide an all optical pulse shaper that is capable of shaping and reshaping optical pulses, thus improving their quality.

Embodiments of one aspect of the present invention provide an all optical chopping device for shaping and reshaping including:
  a threshold device having an input terminal for receiving an optical input signal and an output terminal for emitting an optical output signal in response to a part of the input signal having intensity above a threshold level of the chopping device,
  wherein the output signal is narrower than the input signal.

Embodiments of another aspect of the present invention provide an all optical chopping device for shaping and reshaping including:
  i. a first splitting device having at least first second and third terminals; and
  ii. at least one nonlinear element,
  wherein the second and third terminals form an optical loop including at least one nonlinear element displaced from the center of the optical loop,
  wherein the splitting device is arranged to receive an input signal from the first terminal for splitting the input signal into optical components propagating clockwise and counterclockwise in the optical loop,
  wherein the optical components partially overlap each other at the nonlinear element for producing a first output signal at the first terminal, and
  wherein the first output signal is narrower than the input signal.

Embodiments of yet another aspect the present invention provide an all optical chopping device for shaping and reshaping including:
  i. a splitting device having at least first second and third terminals;
  ii. at least one nonlinear element; and
  iii. at least one attenuator,
  wherein the second and third terminals form an optical loop including at least one attenuator and at least one nonlinear element displaced from the center of the optical loop,
  wherein the splitting device is arranged to receive an input signal from the first terminal for splitting the input signal into optical components propagating clockwise and counterclockwise in the optical loop,
  wherein the optical components partially overlap each other at the nonlinear element for producing a first output signal at the first terminal, and
  wherein the first output signal is narrower than the input signal.

While some of the embodiments of the invention are illustrated as being constructed in one of the media of open space, fiber optics, radiation guides, waveguides, and planar waveguides on a chip, each of them may be fabricated in any of these media. It also should be clear that while the descriptions below describe directional couplers they may also be couplers, splitters, combiners, dielectric beam splitters, metal beam splitters, Y-junctions, one-to-two coupler, two-to-two couplers, star couplers, star combiners, three ports circulators, and four ports circulators.

While some of the operation principles of some of the embodiments of the present inventions are described with reference to relative phase shifts between the phases of the optical component in their optical loop, it should be understood that the operational principle of these embodiments may be related as well to relative rotational angles between the polarization angles of the optical components in the optical loops of these embodiments.

The invention will be described in connection with certain exemplary embodiments, with reference to the following illustrative figures so that it may be more fully understood. With reference to the figures, it is stressed that the particulars shown are by way of example and for purposes of illustrative discussion of the exemplary embodiments of the present invention only, and are presented in the cause of providing what is believed to be the most useful and readily understood description of the principles and conceptual aspects of the invention. In this regard, no attempt is made to show structural details of the invention more detail than is necessary for a fundamental understanding of the invention, the description taken with the drawings making apparent to those skilled in the art how the several forms of the invention may be embodied in practice.

BRIEF DESCRIPTION OF THE DRAWINGS

FIG. 1a is a schematic illustration of a threshold device according to exemplary embodiments of the present invention, including a non-linear optical loop (optical loop structure that includes Non Linear Elements);

FIG. 1b is a schematic illustration of an exemplary attenuator design that may be used in conjunction with the threshold device of FIG. 1a;

FIG. 2 is a schematic illustration of a graph depicting relative phase shift and intensity of output signals produced by a Non Linear Element (NLE) according to exemplary embodiments of the invention in response to input signals of two different amplitudes, showing two pulses propagating in opposite directions for each amplitude;

FIG. 6b is a schematic illustration representing, by a block diagram, the basic modular unit of FIG. 6a;

FIG. 7b is a schematic illustration representing, by a block diagram, the basic modular unit of FIG. 7a;

FIGS. 14a–14e illustrate all optical choppers in accordance with another aspect of the invention designed for self and external chopping;

FIGS. 15b–15e illustrate the sequence steps of the propagation of the optical components in the optical loop of the chopper shown in FIG. 15a;

DETAILED DESCRIPTION OF EMBODIMENTS OF THE INVENTION

Figure 3:
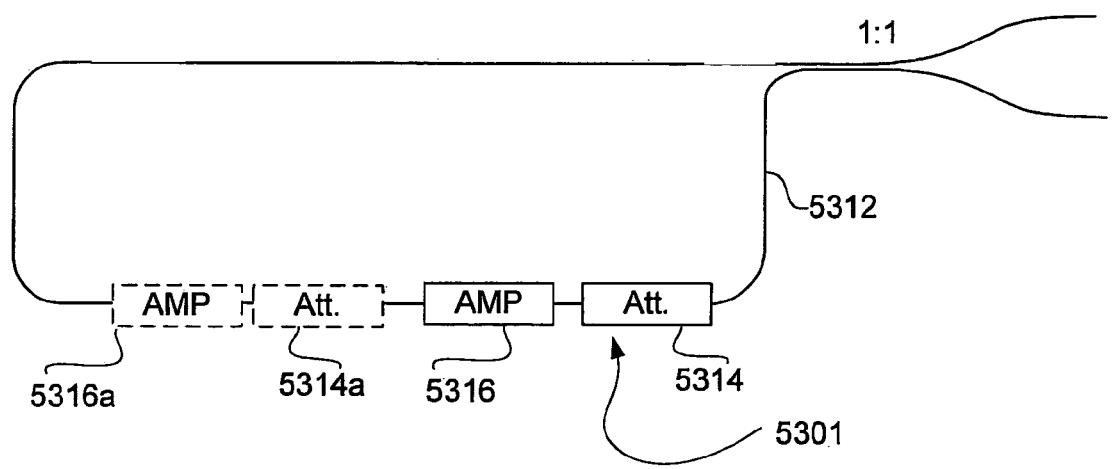
FIG. 3 is a schematic illustration of an alternative design for a threshold device including a non-linear optical loop according to exemplary embodiments of the present invention.

1. All Optical Devices 1.1. Threshold Devices

Reference is made to FIG. 1a, which schematically illustrates an optical threshold device, denoted 5300, in accordance with exemplary embodiments of another aspect of the present invention. Reference is also made to FIG. 1b, which schematically illustrates an attenuator 5314 that may be used in conjunction with exemplary embodiments of the device of FIG. 1a. The design of device 5300 may be beneficial because it is generally insensitive to the phase of the light signals and thus does not require a phase shifter or phase control. Device 5300 includes a symmetric directional coupler 5302 having an input terminal 5304 and an output terminal 5306. Additional two terminals 5308 and 5310 of coupler 5302 may be connected to each other via a loop 5312 in a configuration similar to a loop mirror, as described below. Loop 5312 may include an amplifier 5316 and attenuator 5314. Amplifier 5316 may include any suitable type of amplifier, for example, a SOA, LOA, or EDFA.

Attenuator 5314, which may be connected between connection points 5313 and 5315 on loop 5312, may include any suitable type of attenuator, for example, a Variable Optical Attenuator (VOA). It should be appreciated that the attenuators and/or VOA's used in conjunction with embodiments of the present invention may be implemented in the form of any type of device that causes attenuation of signals, including devices not conventionally used for attenuation purposes. For example, in some embodiments, an attenuation function may be implemented by an optical amplifier, e.g., a SOA, a LOA, or an EDFA, excited to levels at which the amplifier absorbs rather than amplifies input signals. In some exemplary embodiments, attenuator 5314 may include a fixed or variable coupler 5314A, connected between connection points 5313 and 5315, as illustrated schematically in FIG. 1b. The attenuation factor of attenuator 5314 may be adjustable and may depend on the fraction of energy that coupler 5314A may transmit between points 5313 and 5315 as well as the fraction of energy that coupler 5314 may couple out via a set of terminals, denoted 5317 and 5317A. when an input pulse, such as pulse 5320, is received at input 5304 of device 5300, the input pulse may be split by symmetric coupler 5302, e.g., at a splitting ratio of 1:1, into ports 5308 and 5310, respectively. A split pulse 5330 transmitted by port 5310 may propagate counterclockwise (i.e., in the direction of arrow 5324) and its phase may be shifted, by coupler 5302, π/2 radians (i.e., crossbar transmission or crossover transmission). The split pulse 5328 transmitted by port 5308 may propagate clockwise (i.e., in the direction of arrow 5326) and its phase may be not be shifted by coupler 5302 (i.e., bar transmission).

It should be noted that if loop 5312 does not include a NLE component, such as amplifier 5316, the pulses 5330 and 5328 that propagate counterclockwise and clockwise, respectively, complete their travel around loop 5312 and return to ports 5308 and 5310, respectively, with equal amplitudes and the same relative phases. The relative phase is maintained because both pulses 5328 and 5330, which propagate in mutually opposite directions, travel exactly the same distance, i.e., the length of loop 5312. The amplitudes of pulses 5328 and 5330 returning to ports 5310 and 5308, respectively, are equal to each other because they travel through the exact same medium, which is symmetric and linear for both propagation directions. This means that pulse 5330 that returns to port 5308 is π/2 radian ahead with respect to pulse 5328 that returns to port 5310. On their return paths, each of pulses 5328 and 5330, upon arrival at ports 5310 and 5308, respectively, may be re-split into ports 5306 and 5304, e.g., at a 1:1 ratio for each split, wherein the crossover split produces a phase shift of π/2 radians and the bar split does not produce any phase shift. Accordingly, the crossbar split of pulse 5330 from port 5308 may destructively interfere with the bar split of pulse 5328 from port 5310, thereby to produce substantially zero output at output port 5306. At the same time, the crossbar split of pulse 5328 from port 5310 may constructively interfere with the bar split of pulse 5330 from port 5308, thereby to produce a reflected signal that carries substantially the entire energy of pulse 5320 reflected back to input port 5304. Normalizing the input energy of pulse 5320 to a value of 1, the energy at output port 5306, when loop 5312 does not includes NLE 5316, may be given by:

$$I_{5306} = A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \qquad (6)$$

Where j indicates a phase shift of π/2 radians, and A is the intensity attenuation factor of attenuator 5314.

The energy reflected back to input port 5304 may be given by:

$$I_{5304} = A \cdot \left[ \frac{1}{\sqrt{2}} \cdot \frac{j}{\sqrt{2}} + \frac{j}{\sqrt{2}} \cdot \frac{1}{\sqrt{2}} \right]^2 = A \qquad (7)$$

FIG. 2 schematically illustrates a graph showing the relative phase shift and intensity of the output signals of a NLE, for example, amplifier 5316 of FIG. 1a, versus the input signals for two different amplitudes of pulses that propagate in opposite directions. FIG. 2 is use fill in analyzing the operation of device 5300 in FIG. 1a where loop 5312 includes amplifier 5316. The graph of FIG. 2 shows the transmission function of the output intensity Io and the output phase shift Δϕ of NLE amplifier 5316 versus the input intensity Ii. When lower level input pulse 5320 having a normalized field amplitude value of 1 is received by input 5304 of device 5300 in FIG. 1a, the field amplitude of split pulse 5330, denoted 5400 in FIG. 2, propagating in the counterclockwise direction indicated by arrow 5324 in FIG. 1a, is 1/√2 at the entrance of amplifier 5316. Further, in this scenario, the field amplitude of split pulse 5328, denoted 5402 in FIG. 2, propagating in the clockwise direction indicated by arrow 5326 in FIG. 1a, is √A/√2 at the entrance to amplifier 5316. Factor A represents the level of power intensity attenuation resulting from attenuator 5314. Since both pulses, i.e., pulses 5400 and 5402, may be within the linear range of amplifier 5316, the two pulses may be amplified by amplifier 5316 by the same intensity gain factor $G_{linear}$. The two pulses are also attenuated by the same factor A at attenuator 5314. Accordingly, both pulses return to ports 5308 and 5310 after undergoing substantially the same attenuation, A, and the same amplification, $G_{linear}$. Thus, the amplitudes of the two pulses, after amplification and attenuation, may be substantially equal to each other.

As described above, pulses 5400 and 5402 enter amplifier 5316 of FIG. 1a with different field amplitudes, e.g., 1/√2 and √A/√2, respectively. Accordingly, amplifier 5316 may shift the phases of pulses 5400 and 5402 by different amounts. However, since pulses 5400 and 5402 are low amplitude pulses, their phases may be shifted only by small shifts, $\Delta\phi_2$ and $\Delta\phi_{2'}$, respectively, yielding an even smaller additional relative phase shift, $d(\Delta\phi_2) = \Delta\phi_2 - \Delta\phi_{2'}$, between the pulses. The influence of such additional relative phase shift is generally insignificant for the purposes of the invention. Accordingly, the additional relative phase shift produced by amplifier 5316 between pulses 5400 and 5402 is negligible and pulses 5400 and 5402 may return to ports 5308 and 5310 with amplitudes that are substantially equal to each other and with a relative phase shift substantially equal to their original relative phase shift, i.e., similar to the relative phase shift originally produced by coupler 5302, e.g., a phase shift of about π/2 radians.

Because the amplitudes of the pulses returning to ports 5308 and 5310 are substantially equal to each other, and due to the small influence of amplifier 5316 on the relative phases of pulses 5400 and 5402 for low level input signals, the behavior of device 5300 in this case may be generally similar to that of an analogous device (not shown) without amplifier 5316 in loop 5312. Accordingly, in the case of low level input signals, substantially all the energy of pulse 5320, after amplification by gain $G_{linear}$ and attenuation A, may be reflected back to input 5304. Based on the above, the intensity $I_{5306}$ at output port 5306 and the intensity $I_{5304}$ reflected back to port 5304 may be given by the following equations:

$$I_{5306} = G_{linear} \cdot A \cdot \left[ \frac{1}{\sqrt{2}} \cdot \frac{1}{\sqrt{2}} + \frac{j}{\sqrt{2}} \cdot \frac{j}{\sqrt{2}} \right]^2 = 0 \qquad (8)$$

$$I_{5304} = G_{linear} \cdot A \cdot \left[ \frac{1}{\sqrt{2}} \cdot \frac{j}{\sqrt{2}} + \frac{j}{\sqrt{2}} \cdot \frac{1}{\sqrt{2}} \right]^2 = G_{linear} \cdot A$$

where $G_{linear}$ represents the intensity amplification gain within the linear range.

The desired situation in which substantially all the energy of the low level input pulse may be reflected back into the input and there is substantially no signal at the output may be achieved by using symmetric couplers, such as coupler 5302. In contrast, som prior art devices are based on using an asymmetric coupler in the entrance to a loop mirror, wherein the asymmetric coupler is an essential element of the device. It should be appreciated that the above described feature of the present invention, whereby substantially all the energy of the low level input pulse is reflected back to the input, leaving substantially no signal at the output, cannot be achieved in devices based on using asymmetric coupler at the entrance to the loop mirror, such as that used in some prior art devices.

For higher-level input pulses, for example, pulse 5322 in FIG. 1a, having field amplitude H, the counterclockwise split pulse 5404 may enter amplifier 5316 with a field amplitude $H/\sqrt{2}$, which falls within the saturation range of amplifier 5316. The clockwise split pulse 5406 may enter amplifier 5316 with a field amplitude $\sqrt{A} \cdot H/\sqrt{2}$, which falls within the linear range of amplifier 5316. Counterclockwise split pulse 5404 is amplified by amplifier 5316 by intensity gain factor $G_{sat}$, which is smaller than $G_{linear}$ due to the reduced gain in the saturation region, and the phase of pulse 5404 is shifted by the same amplifier 5316 by $\Delta\phi_1 = \Delta\phi_{sat}$. Clockwise split pulse 5406 is amplified by amplifier 5316 by gain factor $G_{linear}$, in the linear region, and the phase of pulse 5406 is shifted by the same amplifier 5316 by $\Delta\phi_{1'}$. Although the ratio between low amplitude pulses 5400 and 5402 may be similar to the ratio between higher amplitude pulses 5404 and 5406, namely, a ratio equal to one divided by the field amplitude attenuation factor $\sqrt{A}$, the difference between the amplitudes of pulses 5404 and 5406 may be much larger than the difference between the amplitudes of pulses 5400 and 5402. Accordingly, the relative phase shift between high level pulses 5404 and 5406, denoted $d(\Delta\phi_1) = (\Delta\phi_{sat} - \Delta\phi_{1'})$, may be much larger than the relative phase shift between low level pulses 5400 and 5402, denoted $d(\Delta\phi_2)$. This means that pulses 5404 and 5406 return to ports 5308 and 5310 with different field amplitudes $\sqrt{G_{sat}} \cdot \sqrt{A} \cdot H/\sqrt{2}$, $\sqrt{G_{linear}} \cdot \sqrt{A} \cdot H/\sqrt{2}$, respectively, and significant different phase shifts, $\Delta\phi_{sat}$ and $\Delta\phi_{1'}$, respectively.

Thus, for such high level inputs, when choosing the proper length of amplifier 5316, $d(\Delta\phi_1)$ may be adjusted to be equal to $\pi$ radians while still maintaining a negligible value, $d(\Delta\phi_2)$, of the relative phase shift for low-level input amplitudes. When $d(\Delta\phi_1)$ is equal to $\pi$ radians, a relatively large fraction of the energy of the higher-level input pulse 5322 may be emitted out by device 5300 through its output 5306 and only a small fraction may be reflected back through input 5304. In this case, the output intensity $I_{5306}$ and the intensity $I_{5304}$ reflected back into input 5304 may be given by:

$$I_{5306} = H^2 \cdot A \cdot \left[ \frac{\sqrt{G_{linear}}}{\sqrt{2}} \cdot \frac{1}{\sqrt{2}} + \frac{\sqrt{G_{sat}}}{\sqrt{2}} \cdot \frac{1}{\sqrt{2}} \right]^2 \neq 0 \qquad (9)$$

$$I_{5304} = H^2 \cdot A \cdot \left[ \frac{\sqrt{G_{linear}}}{\sqrt{2}} \cdot \frac{j}{\sqrt{2}} - \frac{j}{\sqrt{2}} \cdot \frac{\sqrt{G_{sat}}}{\sqrt{2}} \right]^2$$

In the above discussion, device 5300 is analyzed for the case where the reduced amplitude pulse 5406 is in the linear region of amplifier 5316 and the unreduced amplitude pulse 5404 is in the saturated region of that amplifier. It should be noted that there are at least two additional settings relevant to describing effective operation of device 5300. In a first additional setting, pulses 5406 and 5404 have the same gain $G_{linear}$; however, the phase sifts produced for the two pulses by amplifier 5316 are different. In a second additional setting, amplifier 5316 shifts the phases of pulses 5406 and 5404 by the same amount $\Delta\phi_1 = \Delta\phi_{sat}$; however, the gains produced for the two pulses by amplifier 5316 are different.

It should be appreciated that the analysis of device 5300 for the two additional settings of device 5300, in the case of low level input signals, may be generally the same as discussed above with reference to the case where no output signal is produced. Therefore, the two additional settings of device 5300 are not further analyzed herein in the context of low-level input signals.

Analyzing device 5300 in the range of high input signals, according to the first additional setting, it is noted that pulses 5406 and 5404 are both in the linear region of amplifier 5316. In this case, when amplifier 5316 is sufficiently long, when the length of the amplifier is appropriately adjusted and when attenuation factor A is adjusted to produce the proper ratio between pulses 5404 and 5406, the relative phase shift $d(\Delta\phi_1)$ may be adjusted to be equal to $\pi$ radians even when the amplitude of pulse 5404 is still in the linear range. Accordingly, pulses 5404 and 5406 are amplified by the same factor $G_{linear}$. Therefore, $G_{sat}$ may be replaced by $G_{linear}$ in the above equations 9, taking into account phase inversion. In this first additional setting, for high-level input signals, the entire energy may be emitted from output port 5306 and substantially no energy may be reflected back through input 5304.

According to the second additional setting, analyzed for the case of high level input signals, the amplitude of pulse 5406 may be sufficiently high to be included in the saturated range of amplifier 5316 and, thus, amplifier 5316 may not produce any relative phase shift $d(\Delta\phi_1)$ between pulse 5406 and pulse 5404, because both pulses are in the saturated region of amplifier 5316. However, since pulse 5404 may be at a much deeper saturation level than pulse 5406, pulse 5404 may have a gain, $G_{sat1}$, that is much lower than the gain, $G_{sat2}$, of pulse 5406. In this case, the transmitted intensity $I_{5306}$ and the reflected intensity $I_{5304}$ may be given by:

$$I_{5306} = H^2 \cdot A \cdot \left[ \frac{\sqrt{G_{Isat2}}}{\sqrt{2}} \cdot \frac{1}{\sqrt{2}} - \frac{\sqrt{G_{satl}}}{\sqrt{2}} \cdot \frac{1}{\sqrt{2}} \right]^2 \neq 0 \qquad (10)$$

$$I_{5304} = H^2 \cdot A \cdot \left[ \frac{\sqrt{G_{Isat2}}}{\sqrt{2}} \cdot \frac{j}{\sqrt{2}} + \frac{j}{\sqrt{2}} \cdot \frac{\sqrt{G_{satl}}}{\sqrt{2}} \right]^2$$

Accordingly, device 5300 may operate as a threshold device that produces substantially no output signal for lower level input signals, while emitting a large fraction of the energy of higher level input signals through its output 5306. It is clear that, for all the versions of device 5300 described above, the larger the ratio between pulses 5404 and 5406, the larger the relative phase shift $d(\Delta\phi_1)$ between the pulses and the larger the different between $G_{linear}$ and $G_{sat}$, resulting in improved operation of device 5306 for the higher level input signals. It should be appreciated that, in device 5300 according to exemplary embodiments of the present invention, there may be virtually no limitation on the ratio between pulses 5404 and 5406, and the ratio may be as desired, for example, equal to one over the attenuation factor of attenuator 5314. Further, in view of the above analysis, it should be appreciated that although the use of a large attenuation factor, i.e., a small value for A, may improve the performance of device 5300 in the range of higher level input signals, such large attenuation does not degrade the performance of device 5300 in the range of lower level input signals.

It is noted that a high ratio between pulses is also desired for some prior art devices; however, in contrast to the present invention, the allegedly high ratio achieved by some prior art devices results from the asymmetry of the input coupler of the device. To produce the desired ratio according to these prior art devices, the level of asymmetry of the asymmetric coupler must be very significant, preventing the device from blocking lower level input signals, thereby limiting and/or compromising the performance of such a device.

It is appreciated that, in contrast to prior art devices, where performance must be compromised, at least, for either the low-level input signals or the high-level input signals, there is no such compromise in device 5300 according to the present invention.

Referring again to FIG. 1*a*, a virtual mid point 5318 divides loop 5312 into two halves, wherein each half has an equal length, S, representing the distance from port 5310 to mid point 5318 or from port 5308 to mid point 5318. It is noted that the counterclockwise pulse 5330 and the clockwise pulse 5328 inherently meet and overlap each other at mid point 5318. When streams of pulses that are separated from each other by time periods, T, enter loop 5312 of device 5300, and split into clockwise and counterclockwise streams, a pulse in the counterclockwise stream, such as pulse 5330, meets a pulse in the clockwise stream, such as pulse 5328, every half time period, T/2. This means that after every distance $X=T/2 \cdot C/n$, wherein C is the speed of light in vacuum and n is the refractive index of the optical guides, there is a meeting ("collision") point between pulses that propagate in loop 5312 in opposite directions. To avoid such collisions from occurring at the NLE, e.g., at amplifier 5316, the location of the NLE should be off center by a distance $\delta S$ that may be given by:

$$l \cdot X < \delta S < m \cdot X \qquad (11)$$

where X is the above given distance between two adjacent meeting (collision) points and 1 and m are consecutive integers. For the specific example of l=0 and m=1, Equation 11 may be reduced to: $\delta S < X$.

When a low amplitude pulse, such as pulse 5406, enters amplifier 5316 first, the pulse does not deplete an inverse population of the amplifier and, thus, a higher amplitude pulse 5404 may enter the NLE immediately following the exit of pulse 5406. In a situation when the order of the locations of amplifier 5316 and attenuator 5314 is reversed, the higher amplitude pulse may enter NLE 5316 first. In this reverse order case, the higher amplitude pulse may deplete the inverse population of amplifier 5316 and, thus, a recovery time $\Delta\tau$ may be needed for amplifier 5316 to build an inverse population before entry of a lower amplitude pulse. Therefore, in the latter case, or in a situation where the stream of input pulses includes only high amplitude pulses, T/2 may be longer than $\Delta\tau$.

As discussed above, the efficiency of device 5300 may be improved by increasing the ratio between the higher and the lower levels included in the input signal. Further, the output signals produced by device 5300 that correspond to different levels of input pulses have a more distinctive amplitude ratio than the ratio between their respective input pulses. Accordingly, an improved threshold system in accordance with exemplary embodiments of the present invention may include a configuration of a more than one device 5300, for example, at least two devices 5300 connected in series, wherein the output signals from one device 5300 may be fed directly into the input of a subsequent device 5300. Such a configuration may be used to improve threshold capability by further accentuating the distinction between lower and higher amplitude pulses.

Referring to FIG. 3, a threshold device 5301 in accordance with further exemplary embodiments of the invention is shown. The design of device 5301 is a modified version of the design of device 5300. In addition to the NLE-attenuator functionality, which may be performed by amplifier 5316 and attenuator 5314, as described above with reference to device 5300, device 5301 includes additional NLE-attenuator functionality, which may be embodied in the form of an amplifier 5316*a* and an attenuator 5314*a*. As discussed above with reference to optimizing the operation of device 5300, the length of amplifier 5316 may be adjusted to produce a relative phase shift $d(\Delta\phi_1)$ equal to $\pi$ radians. However, since the required adjusted length for amplifier 5316 in device 5300 may not be commercially available and may be difficult to produce, the additional set of amplifier 5316*a* and attenuator 5314*a* may be added to enable such adjustment. In this case the required length of each amplifier (5316 or 5316*a*) of device 5301 may be about half of the required length required for the single amplifier 5316 in device 5300. In some alternative embodiments, similar relative phase shifting may be achieved by adding only amplifier 5316*a*, i.e., without using attenuator 5314*a*; however, the addition of attenuator 5314*a* may useful to enable a further increase of the amplitude ratio between the counterclockwise and the clockwise signals propagating in loop 5312.

Figure 4:
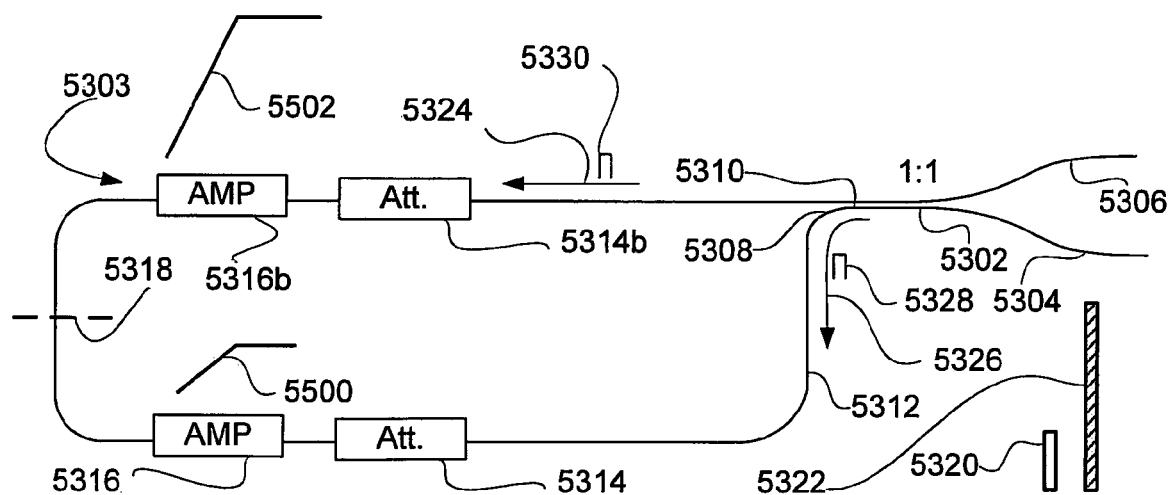
FIG. 4 is a schematic illustration of another alternative design for a threshold device including a non-linear optical loop according to exemplary embodiments of the present invention.

FIG. 4 schematically illustrates a device 5303, which is a variation of the design of device 5300 of FIG. 1*a*. Device 5303 may enable expansion of the range of lower level input signal for which the very high performance and output signals very close to zero may be obtained. As shown in FIG. 4, device 5303 has generally the same structure as device 5300, with the addition of an amplifier 5316*b* and an attenuator 5314*b*. Except for amplifier 5316*b* and attenuator 5314b, identical reference numerals are used in FIGS. 1a and 4 to indicate components with identical or similar structure and functionality. The parameters of attenuator 5314b and amplifier 5316b may be generally identical to those of attenuator 5314 and amplifier 5316, respectively; however, amplifier 5316b may be excited to a higher excitation level than amplifier 5316. Transmission functions of amplifiers 5316b and 5316 are roughly illustrated by symbols 5502 and 5500, respectively, in FIG. 4.

For lower level input signals, such as pulse 5320, amplifiers 5316b and 5316 both operate at their linear region in a similar way and, thus, loop 5312 may be quasi-symmetric and the entire energy of the input signal may be reflected back into input 5304. However, the range of the low level input signals for which the output signals are very close to zero is expanded in device 5303 relative to device 5300. This range expansion is possible because the quasi-symmetric configuration of loop 5312 is maintained in device 5303 for a wider range of input amplitudes due to a phase shift compensation produced by amplifier 5316b to compensate for the small phase shift that amplifier 5316 may produce, as described in detail above. Since amplifiers 5316 and 5316b are excited to different levels of excitations, their gain and phase shifts may not be identical and, therefore, it is appreciated that the phase shift compensation of amplifier 5316b applied to the phase shift of amplifier 5316 may not be perfect. However, since the phase shifts produced by amplifiers 5316 and 5316b in the range of low level input signals is generally small, the difference between these phase shifts (after the compensation) is smaller yet and has no significant influence on the operation of device 5303 over a wider range of lower level input signals.

For higher-level input signals, such as pulse 5322, the additional amplifier 5316b is still within the range of small phase shifts in the linear region and may operate quasi-symmetrically for both counterclockwise and clockwise pulses, such as pulses 5330 and 5328. Thus the set of amplifier 5316b and attenuator 5314b maintains their quasi-symmetry even for the higher-level input signals. However, amplifier 5316 having a saturation level that is lower than the saturation level of amplifier 5316b is driven into a saturation state by the counterclockwise pulses 5330 it receives, yet the amplifier is not driven into saturation by the clockwise pulses 5328 it receives. Accordingly, in this situation, the set of amplifier 5316 and attenuator 5314 "breaks" the symmetry of loop 5312 in a way similar to that explained above with reference to device 5300 of FIG. 1a. At the same time, the set of amplifier 5316b and attenuator 5314b has little influence on the symmetry of loop 5312. Accordingly, in this situation, for higher-level input signal, only amplifier 5316 and attenuator 5314 have a significant role in the production of output signals, whereby device 5303 operates in this range in a manner similar to the operation of device 5300 as discussed above with reference to FIG. 1a.

In accordance with embodiments of the invention, each of devices 5301 and 5303 may have a "turn on" point, which may function as a threshold level. For low-level input signals in the range, e.g., below the "turn on" threshold levels output signals are strongly attenuated by destructive interference at the output port of the devices and the transmission function between the input and the output of these devices includes a monotonic range with a shallow slope. For high-level input signals, e.g., in a range above the "turn on" threshold level, the output signal at the output port of the devices increases sharply and the transmission function between the input and the output of these devices may include a range having a steep monotonic slope.

Adjustable parameters that may be used to adjust the "turn on" threshold may include but are not limited to the gain G and the length L of amplifiers 5316, 5316a and 5316b, and the attenuations of attenuators 5314, 5314a and 5314b. The excitation levels, the gains, and the attenuations of the different amplifiers and attenuators may be different for each amplifier and/or attenuator.

Devices 5300, 5301 and 5303 of FIGS. 1a, 3, and 4, respectively, may include a continuous sequence of optical components connected by light guiding media such as, for example, optical fibers, planar waveguides, or planar circuits (PLC), which media may be fabricated using integrated optic techniques and/or on-chip manufacturing. Alternatively, devices 5300, 5301 and 5303 may be constructed from discrete components, in which case the optical guiding media may be replaced by open space, e.g., vacuum, or by a non-solid, e.g., gaseous media, and the directional couplers may be replaced with beam splitters. It should be understood that all amplifiers and attenuators include variable and/or adjustable components.

1.2. All Optical Logic Gates

Figure 5A:
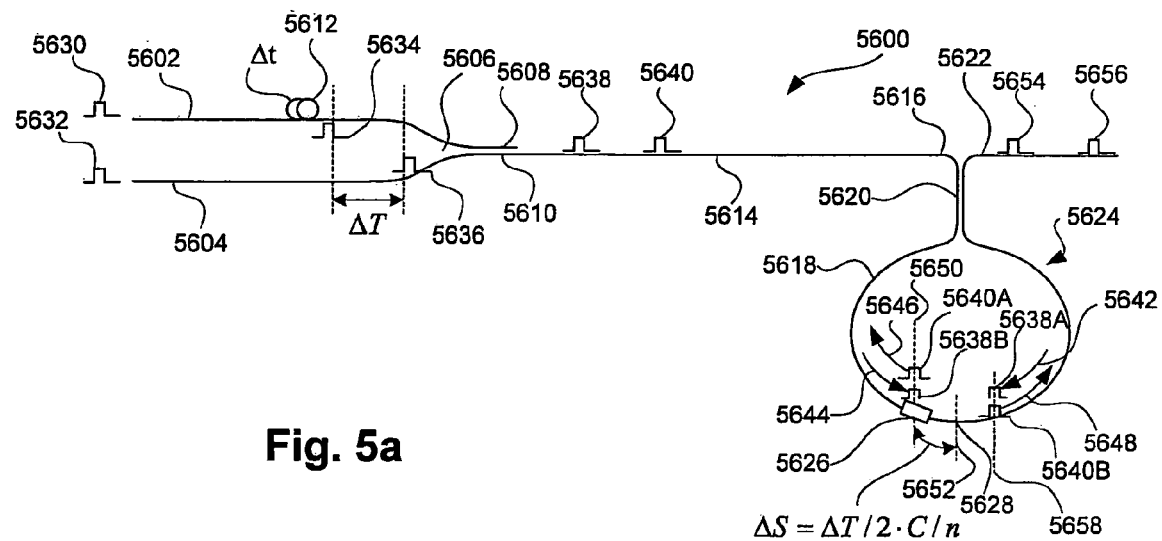
FIGS. 5a–5c are illustrations of phase insensitive AND logic gates according to the present invention.
Figure 5B:
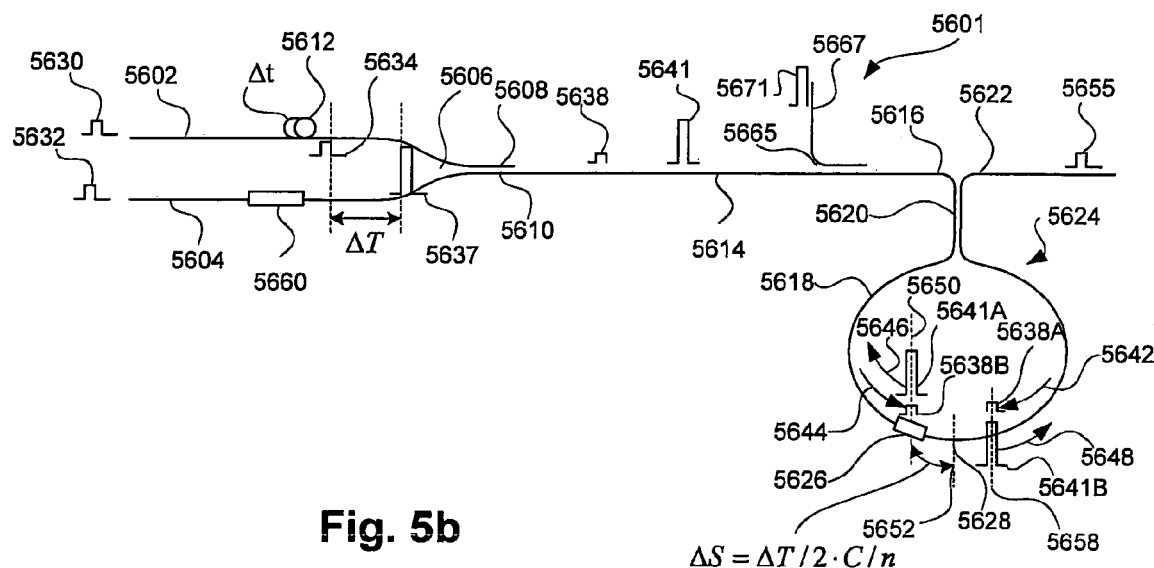
Figure 5C:
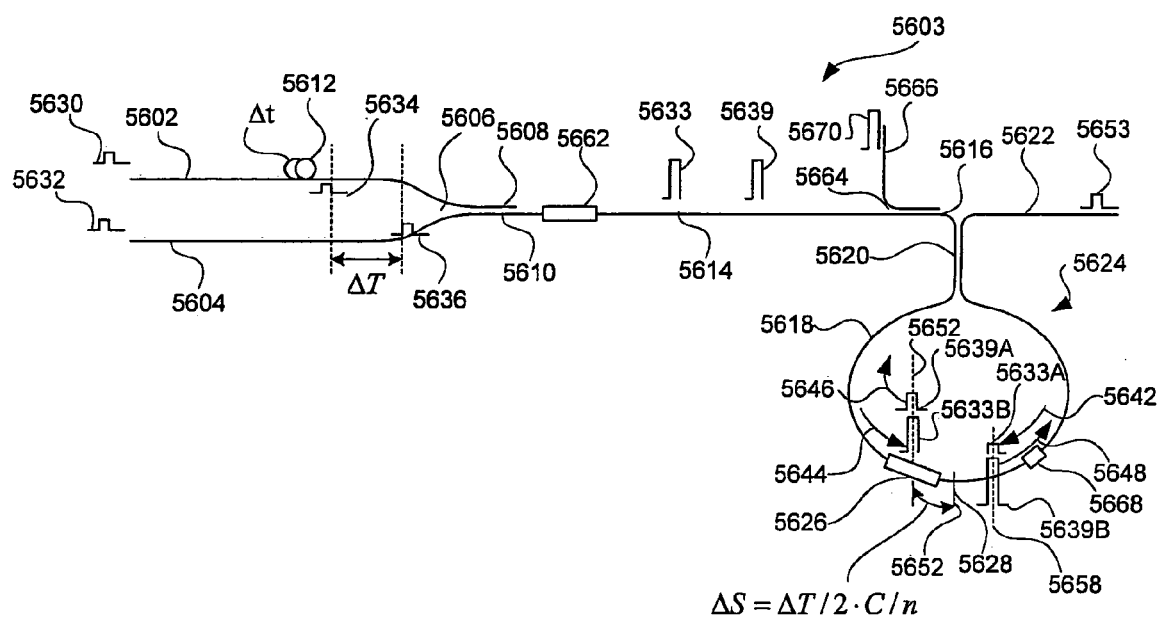

FIGS. 5a–5c illustrate configurations for AND logic gates.

FIG. 5a illustrates logic AND gate 5600 that includes directional coupler 5606 having two inputs 5602 and 5604 and two outputs 5608 and 5610. Input 5602 includes delay guide 5612 that produces a time delay Δt. Output 5610 of coupler 5606 is connected, by guide 5614, to input 5616 of a loop mirror (Sagnac loop) 5624. Loop mirror 5624 includes symmetric directional coupler 5620 having, on one of its sides, input 5616 and output 5622 and its other two terminals, on its other side, are connected to each other to form loop 5618. Loop 5618 contains NLE 5626, such as, SOA or LOA that is displaced from mid point 5628 of loop 5618. Mid point 5628 is the point on loop mirror 5624 in which the distances to coupler 5620 in the clockwise and in the counterclockwise directions are the same.

In a situation when gate 5600 receives in either of its inputs 5602 or 5604 either of signals 5630 or 5632 propagating as signal 5634 or 5636, then coupler 5606 launches, into guide 5614, either pulse 5638 or 5640, respectively. In this case, either of the signals 5638 or 5640 enters to loop mirror 5624 through its input 5616. In such a situation when only a single pulse enters to loop 5618 it is split into a pair of pulses. Symmetric coupler 5620 divides pulse 5638 or 5640 into equal amplitude split pulses 5638A and 5638B or 5640A and 5640B propagating in loop 5618 in opposite directions, clockwise and counter counterclockwise as shown by arrows 5642, 5644, 5646, and 5648, respectively. The pulses propagating clockwise and counterclockwise collide in mid point 5628. The displacement of NLE 5626 from mid point 5628 assures that there win not be any collision, on amplifier 5626, between the split pulses 5638A and 5638B or between split pulses 5640A and 5640B. Each pair of split pulses 5638A and 5638B or split pulses 5640A and 5640B experience, during their travel along loop 5618, the same phase shift and the same amplification. The pulses in either of the pairs complete their travel along loop 5618 and return back to coupler 5620 with the same amplitude and with the same relative phase as they had when they enter to loop 5618 from coupler 5620. Each propogating pair 5638A and 5638B or 5640A and 5640B travel the same distance of loop 5618, thus the returned pulses pair reach coupler 5620 at the same time. Accordingly, coupler 5620 combines the returned pulses 5638A and 5638B or 5640A and 5640B in a way that all their energy is emitted back into input 5616 and no signal is emitted through output 5622 of gate 5600. This means that when only one signal 5630 or 5632 is received by gate 5600 at its input 5602 or 5604, no output signal is produced, by gate 5600, at output 5622.

When both signals 5630 and 5632 exist simultaneously at inputs 5602 and 5604, they enter coupler 5606 as pulses 5634 and 5636, respectively, with a time separation of Δt produced by delayer 5612. Coupler 5612 launches pulses 5634 and 5636, into guide 5614, as pulses 5638 and 5640, respectively, having the same time separation Δt. Pulses 5638 and 5640 enter loop 5624 through input 5616 and are split by coupler 5620 into two pairs of pulses 5638A and 5638B and 5640A and 5640B propagating in loop 5618 as described above.

Unlike the above described cases in which either of the split pairs propagates individually in loop 5618 and there is no collision, on amplifier 5626, between the pulses of the different pairs, in this case, some of the pulses in the pairs of pulses 5638A and 5638B and 5640A and 5640B can collide on amplifier 5626.

It can be seen that the pulses propagating in loop 5618 can be divided into two pairs, the pair that propagates clockwise that includes pulses 5640A and 5638A and the pair that propagates counterclockwise that includes pulses 5640B and 5638B. Accordingly, pulses 5640A and 5640B and pulses 5638A and 5638B collide at mid point 5628 defined as the intersection point where line 5652 crosses loop 5618. Pulses 5640B and 5638A collide at the intersection point where line 5658 crosses loop 5618; this point is located at a distance ΔS to the right of mid point 5628. Likewise, Pulses 5638B and 5640A collide at the intersection point where line 5650 crosses loop 5618; this point is located at a distance ΔS to the left of mid point 5628. ΔS is equal to half of the space between pulses 5640 and 5638, 5640B and 5638B or between 5640A and 5638A. The NLE 5626 is displaced, to the left, off center from mid point 5628 by a distance ΔS that is equal to half of the space between the pulses of the pair of pulses that include the following pulses: 5638 and 5640, 5638A and 5640A, or 5638B and 5640B. The amount of displacement of amplifier 5626 from mid point 5628 is indicated by the distance between lines 5650 and 5652 along loop 5618 and is given by:

$$\Delta S = \Delta t/2 \cdot C/n$$

where C is the speed of light in vacuum and n is the index of refraction of the material from which the radiation guides of gate 5600 are made.

In such a case pulses 5638B and 5640A collide on amplifier 5626 on line 5650. The amplitudes of pulses 5638B and 5640A are relatively small amplitudes that are in the linear range of amplifier 5626. However, when amplitudes 5638B and 5640A collide on amplifier 5626, they produce, within NLE 5626, a combined high amplitude signal. The combined high amplitude signal may cause NLE 5626 to produce a phase shift of π radians to each of the pulses 5638B and 5640A during their travel back to coupler 5620.

Accordingly, in the optimal case, pair of pulses 5640A and 5640B may return back to coupler 5620 with a relative phase that differs by π radians from the relative phase between these pulses when they entered loop 5618 from coupler 5620. Thus coupler 5620 combines their radiation constructively in output terminal 5622 and emits their energy thoroughly from output 5622 of gate 5600 as pulse 5656 and no signal is returned back to input 5616, which in this case, is the destructive terminal. A similar process is applied to pulses 5638A and 5638B and their combined radiation is also emitted thoroughly from output 5622 of gate 5600 as pulse 5654.

It can be seen that when an input signal exists at either of the inputs of gate 5600 or no signal exists at its inputs, no output signal is produced at output 5622 of gate 5600. In case that input signals exist simultaneously in both inputs of gate 5600, an output signal in the form of two pulses is formed at the output of gate 5600. Thus when defining the double pulse signal, at output 5622 of gate 5600, with the specific spacing between its pulses, as logic state "1", gate 5600 operates as a logic AND gate.

In case that the logic state "1" should be defined by a single output pulse, a variation of gate 5600 may be used as shown in FIG. 5b.

FIG. 5b illustrates logic AND gate 5601 which is a variation of gate 5600 shown in FIG. 5a. The same referral numeral is used in FIGS. 5a and 5b to indicate similar components and signals. Gate 5601 of FIG. 5b has a structure similar to the structure of gate 5600 of FIG. 5a with the additional optical amplifier 5660 included in input 5604. The time delay Δt and the distance ΔS are the same in both of the drawings.

When an input signal 5630 or 5632 is received by either one of inputs 5602 or 5604, then coupler 5606 receives, in its input, signal 5634 or 5637 and emits signal 5638 or 5641 from its output 5610 into radiation guide 5614, respectively. The amplitude of signal 5632 is amplified, by amplifier 5660 located at input 5604, to produce high amplitude signal 5637. Accordingly, the amplitude of signal 5637 is larger than the amplitude of signal 5632. Thus the amplitude of signal 5641 corresponding to signal 5637 is larger than the amplitude of signal 5638 corresponding to signal 5634.

When either one of the signals 5641 or 5638 passes through coupler 5665 and enters from guide 5614 to input 5616 of loop mirror 5624 that includes coupler 5620, loop 5618, and NLE 5626, it is reflected back into input 5616 as explained above for individual pulses 5638 and 5641 of FIG. 5a. Part of the reflected pulse may be emitted out, from terminal 5667 of coupler 5665, as pulse 5671.

When signals 5632 and 5630 appears simultaneously at inputs 5604 and 5602, a pair of pulses 5641 and 5638 separated by a time delay Δt are produced, respectively, by coupler 5606 and delayer 5612, in a way similar to the explained for pulses 5640 and 5638 of FIG. 5a. Unlike signal 5640 of FIG. 5a, Signal 5641 of FIG. 5b has a larger amplitude than the amplitude of signal 5638.

When the two pulse signals 5641 and 5638 are received at input 5616 of coupler 5620, they are split into two pairs of pulses that propagate in loop 5618 in opposite directions. The pair that includes signals 5641A and 5638A travels clockwise and the pair that includes signals 5641B and 5638B travels counterclockwise. Pulses 5641B and 5638A pass, on their way back to coupler 5620, through amplifier 5626 without colliding, at this amplifier, with other signals. Pulses 5641A and 5638B pass, on their way back to coupler 5620, through amplifier 5626 while colliding, at this amplifier, with each other.

The high amplitude of signals 5641A and 5641B is in the saturated range of amplifier 5626 and the amplitude of signals 5638A and 5638B is relatively small and is in the linear range of amplifier 5626. In the optimal case, the phase difference between the phase shifts, produced by amplifier 5626, for the high amplitude of signals 5641A and 5641B and the low amplitude of signals 5638A and 5638B is π radians. The phase of large signal 5641B that individually passes through amplifier 5626 is shifted by the same amount as the phase of large signal 5641A when passing through amplifier 5626 and colliding, at this amplifier, with pulse 5638B since amplifier 5626 is saturated in both cases. Accordingly, large amplitude pulses 5641A and 5641B return back to coupler 5620 and are combined there with the same relative phase in which they entered loop 5618 from coupler 5620. Thus the energy of combined pulses 5641A and 5641B is totally reflected back into input 5616 and part of that energy is coupled, by coupler 5665, into terminal 5667 and is emitted there as pulse 5671. In this case no output signal is generated at output 5622.

The phase of signal 5638B passing through amplifier 5626 and colliding, on this amplifier, with pulse 5641A is shifted by $\pi$ radians relative to the phase of signal 5638A passing through amplifier 5626 without colliding with any other pulse. This relative phase shift of $\pi$ radians is produced since amplifier 5626 is driven into saturated region by pulse 5641A, phase shifting pulse 5638B that passes amplifier 5626 at the same time. When pulse 5638A passes through amplifier 5626 alone (without colliding with any other pulse), the amplifier 5626 is not saturated, thus operates in the linear region, and no relative phase shift occurs.

Thus, in this optimal situation, pulses 5638A and 5638B return back to coupler 5620 and are combined there with a relative phase which differs by $\pi$ radians from the phase in which they entered loop 5618 from coupler 5620. Accordingly, the energy of combined pulses 5638A and 5638B is thoroughly emitted from output 5622 as signal 5655 and no signal is reflected back into input 5616 or terminal 5667.

The distance in which amplifier 5626 is displaced off center from mid point 5628 has to assure interaction between signals 5638B and 5641A. In a situation that the recovery time of amplifier 5626 (after being driven into saturation by signal 5638B) is $\tau$, then its interaction length L is given by:

$$L = C\tau/n.$$

Accordingly, gate 5601 can operate in a manner similar to the explained above even if signal 5641A would not collide with signal 5638B, on amplifier 5626, and would reach amplifier 5626 at a time $\tau$ after signal 5638B. This means that for proper operation, device 5601 can tolerate a deviation in the value of $\Delta S$ in the amount that up to L/2 to the left of line 5652. At the same time distance $\Delta S$ has to assure that no interaction would occur between signals 5638A and 5638B or between signals 5641A and 5641B and thus should satisfy:

$$\Delta S > L$$

It can be seen that when an input signal exists at either of the inputs of gate 5601 or no signal exists at its inputs, no output signal is produced at output 5622 of gate 5601. In case that two input signals exist simultaneously in both inputs 5602 and 5604 of gate 5601, an output signal is formed at the output of gate 5601. Thus gate 5601 of FIG. 5b operates as a logic AND gate that unlike gate 5600 of FIG. 5a, produces a single output signal 5655 for its logic sate "1" at its output 5622.

FIG. 5c illustrates an additional design for gates 5600 and 5601 illustrated by FIGS. 5a and 5b, respectively. The design of gate 5603 of FIG. 5c is similar to the design of gate 5601 of FIG. 5b. Accordingly, the same referral numerals are used in FIGS. 5b and 5c to indicate similar components and signal. The following changes were done to convert the design of FIG. 5b into the design of FIG. 5c:

1. Amplifier 5660 was moved from input 5604 to guide 5614 and is marked as amplifier 5662.
2. Attenuator 5668 was added to loop 5618.
3. Coupler 5664 was added on guide 5614 at input 5616 of mirror loop 5624.

The same conditions for the distance $\Delta S$, in which amplifier 5626 should be displaced off center from mid point 5628 of FIG. 5b, also stand for the design of FIG. 5c.

Pulses 5639 and 5633 in radiation guide 5614 are formed, as explained for gate 5600 of FIG. 5a, by the interleaver that includes inputs 5602 and 5604, delayer 5612, and coupler 5606 with the additional amplification by amplifier 5662. Accordingly, when input signal 5630 or 5632 is received by input 5602 or 5604, respectively, then signal 5633 or 5639 is produced at guide 5614.

In any of these cases, one signal (5633 or 5639) enters, with high amplitude, to device 5624 through its input 5616. Device 5624 including input 5616, output 5622, coupler 5620, loop 5618, amplifier 5622 and attenuator 5668, is similar to threshold device 5300 of FIG. 1a and behaves similarly. Thus, in optimal conditions and when high amplitude signal 5633 or 5639 enters device 5624, its amplitude is above the threshold of device 5624 and, as explained above for device 5300 of FIG. 1a, it is emitted out of device 5624 through its output 5622 and no signal returns back into input 5616.

When input signals 5630 and 5632 are received simultaneously, by inputs 5602 and 5604, respectively, then signals 5633 and 5639 are produced at guide 5614. In this case, signal 5633 is delayed relative to signal 5639 by a time delay $\Delta t$ produced by delayer 5612. In this case, when pair of high amplitude signals 5639 and 5633 is received in input 5616 it is split, by coupler 5620 into two pairs of pulses that propagate in loop 5618 in opposite directions. One pair includes signals 5639A and 5633A travels clockwise along arrows 5646 and 5642. This pair is converted, by attenuator 5668, into a pair of small amplitude signals 5639A and 5633A that are in the linear range of amplifier 5626. The other pair includes high amplitude signals 5639B and 5633B that are in the saturated region of amplifier 5626 and travels counterclockwise along arrows 5648 and 5644. Signals 5639B and 5633A pass, on their way back to coupler 5620, through amplifier 5626 without colliding or interacting with other signals on or by this amplifier. Pulses 5639A and 5633B pass, on their way back to coupler 5620, through amplifier 5626 while colliding or interacting with each other on or by this amplifier.

The large amplitude of signals 5633B and 5639B fall within the saturated region of amplifier 5626; the amplitude of signals 5633A and 5639A is relatively small and is in the linear region of amplifier 5626. In the optimal case, the phase difference between the phase shifts, produced by amplifier 5626, for the high amplitude of signals. 5633B and 5639B and the low amplitude of signals 5633A and 5639A is $\pi$ radians. The phase of high amplitude signal 5639B passing through amplifier 5626 is shifted according to the saturated state of amplifier 5626. In spite of the fact that signal 5639A is a low amplitude signal, the phase shift caused to this signal, by amplifier 5626, is according to the saturated state of amplifier 5626. This phase shift is produced by amplifier 5626 since at the same time that pulse 5639A passes through amplifier 5626, this amplifier is driven into saturated state, by pulse 5633B. Thus, the phase of signal 5639B passing through amplifier 5626 is shifted by the same amount as the phase of signal 5633B when it passes through amplifier 5626 and collide or interact, on or by this amplifier, with pulse 5639A since amplifier 5626 is saturated in both of the cases. Accordingly, pulses 5639A and 5639B return back to coupler 5620 and are combined there with the same relative phase in which they entered to loop 5618 from coupler 5620. Thus the energy of combined pulses 5639A and 5639B is totally reflected back into input 5616 and no output signal is generated at output 5622. The signal reflected back into input 5616 is emitted out, as signal 5670, by coupler 5664 through output 5666.

The high amplitude signal 5633B that passes through amplifier 5626 drives this amplifier into saturated state even without the collision, on this amplifier, with pulse 5639A. This means that the collision of pulse 5633B with pulse 5639A does not influence the phase shift of pulse 5633B produced by amplifier 5626. Pulse 5633A passes through amplifier 5626 without any interaction with other pulses. Thus, pulses 5633A and 5633B return back to coupler 5620 and are combined there with a relative phase that is not influenced by the collision on amplifier 5626. In such a case, device 5624 operates, for pulses 5633A and 5633B, in the regular mode of threshold device and as explained for threshold device 5300 of FIG. 1a. Accordingly, the energy of combined pulses 5633A and 5633B is thoroughly emitted from output 5622 as signal 5653 and no signal is reflected back into input 5616 and thus no signal is generated at output 5666.

It can be seen that when an input signal exists at either of the inputs of gate 5603 or no signal exists at its inputs, no output signal is produced at output 5666 of gate 5603. In case that input signals exist simultaneously in both of the inputs of gate 5603, an output signal is formed at the output of gate 5666. Thus gate 5603 of FIG. 5c operates as a logic AND gate that like gate 5601 of FIG. 5b but, unlike gate 5600 of FIG. 5a, produces a single output signal for its logic sate "1" at its output.

It should be clear that under optimal conditions the logic states "1" and "0" are represented by the existence and the absence of signals in the outputs of gates 5600, 5601 and 5603 of FIGS. 5a–5c, respectively. If the conditions are not optimal, the logic states "1" and "0" are represented by high and low signals in these outputs.

The above described embodiments, designed according to the present invention, to be all-optical threshold and logic-gate devices, can be used in their entirety or partially to design optical pulse choppers, shapers, and re-shapers as described and explained below.

2. Pulse Shaping and Generation of Narrow Pulses 2.1. Modular Units

Figure 6A:
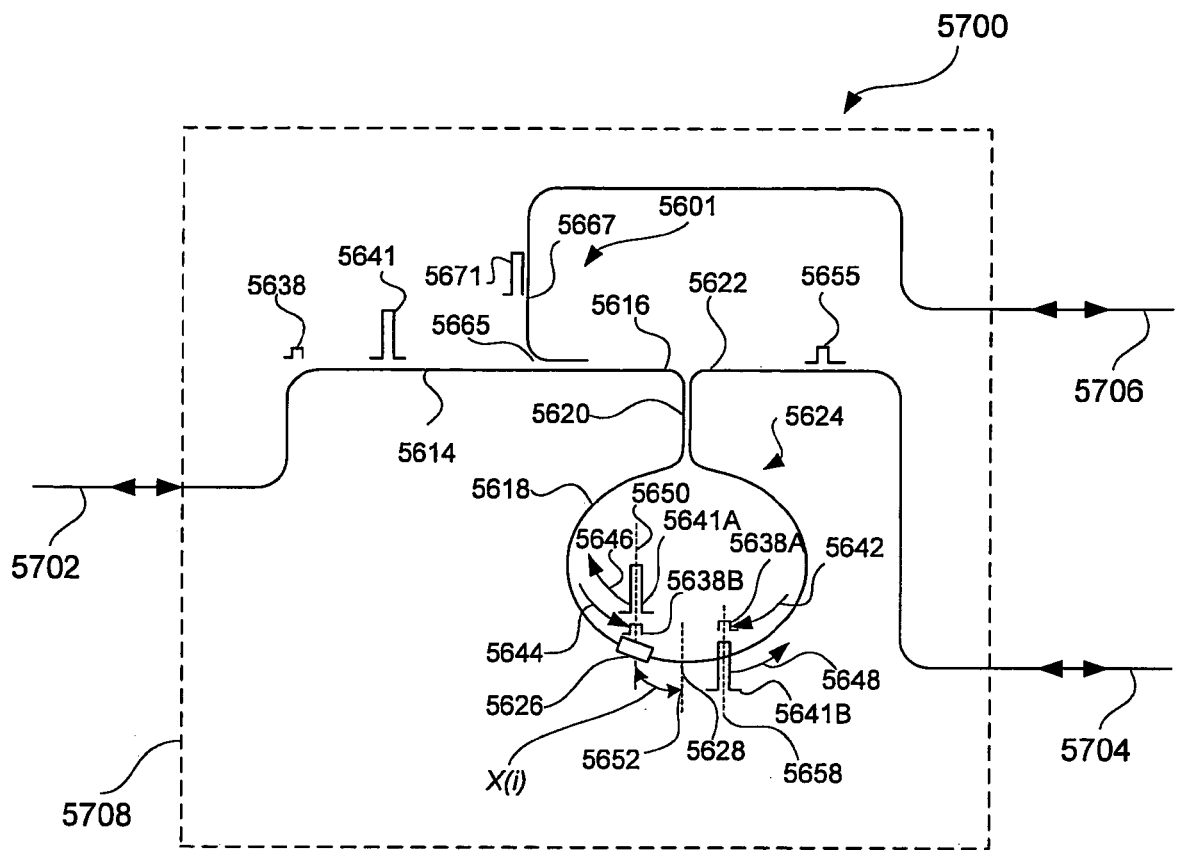
FIG. 6a is a schematic illustration of a basic modular unit that is a part of the AND logical gate of FIG. 5b.

FIG. 6a illustrates a device 5700 serving as a basic modular unit for several applications as illustrated and discussed below. Device 5700 is thoroughly included in device 5601 of FIG. 5b and thus the same referral numerals are used in FIGS. 5b and 6a to indicate the same structures and signals. Device 5700 is constructed by removing coupler 5606, terminals 5602 and 5604, amplifier 5660 and delay line 5612 from device 5601 of FIG. 5b. Radiation guide 5614, terminal 5622, and terminal 5667 of FIG. 5b serve as Input/Output (I/O) terminals 5702, 5704, and 5706 of device 5700 of FIG. 6a, respectively. Rectangular 5708 illustrated by a broken line may schematically represent a package containing device 5700, through which I/O terminals 5702, 5704, and 5706 of device 5700 pass through.

Figure 6B:
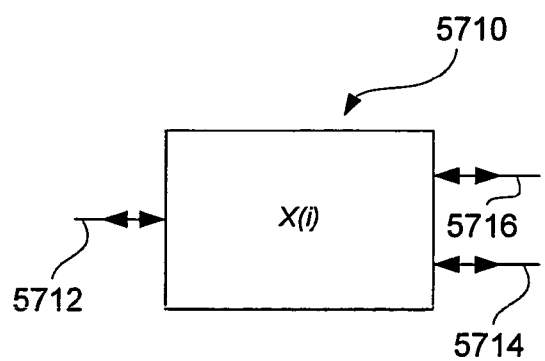

FIG. 6b is a block diagram illustration 5710 of device 5700 of FIG. 6a that may be used as modular unit having I/O terminals 5712, 5714 and 5716 corresponding to terminals 5702, 5704, and 5706 of device 5700 of FIG. 6a, respectively. Device 5710 is characterized by parameter X(i) indicating the amount of displacement of amplifier 5626 of FIG. 5b from midpoint 5628 of FIG. 5b, as illustrated by FIG. 6a. Positive and negative symbols may be added to parameter X(i) to indicate that the displacement of amplifier 5626 from mid point 5628 is in clockwise or counterclockwise directions, respectively.

Figure 7A:
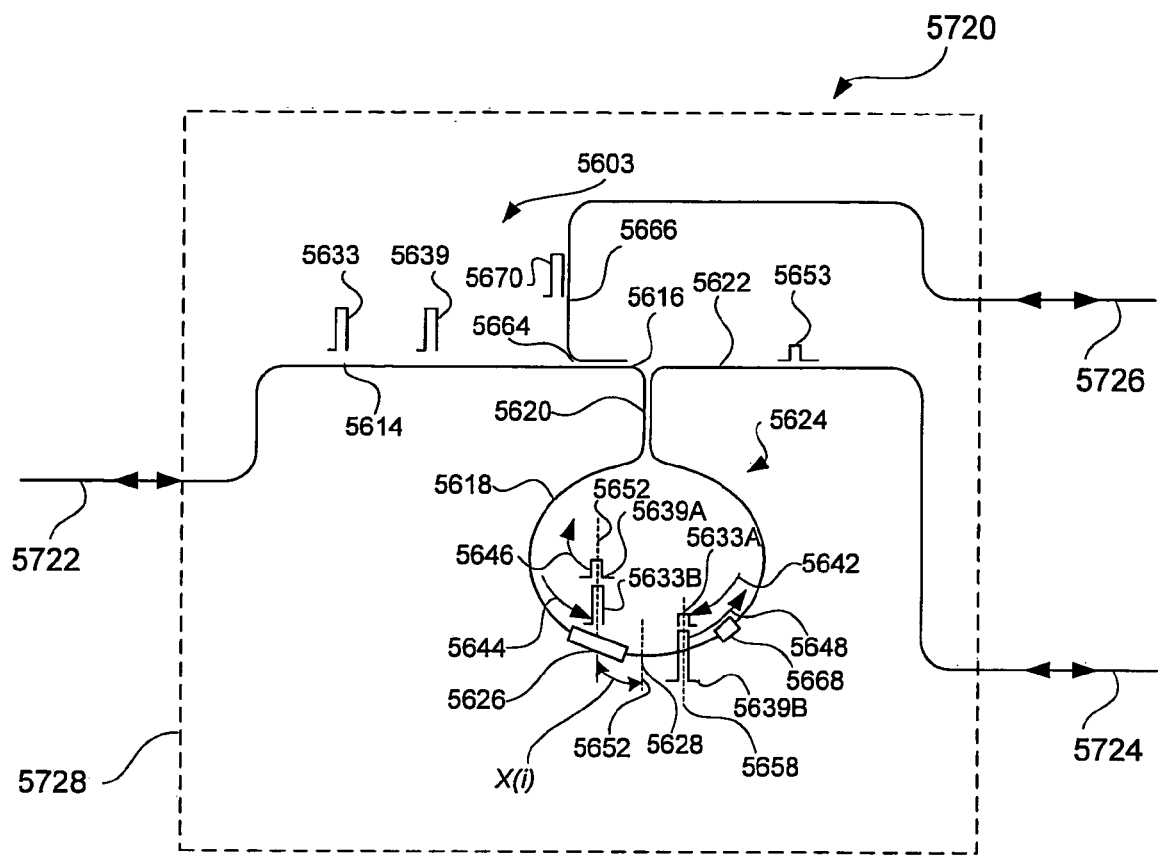
FIG. 7a is a schematic illustration of a basic modular unit that is a part of the AND logical gate of FIG. 5c.

FIG. 7a illustrates a device 5720 serving as a basic modular unit for several applications as illustrated and discussed below. Device 5720 is thoroughly included in device 5603 of FIG. 5c and thus the same referral numerals are used in FIGS. 5c and 7a to indicate the same structures and signals. Device 5720 is constructed by removing coupler 5606, terminals 5602 and 5604, amplifier 5662 and delay line 5612 from device 5603 of FIG. 5c. Radiation guide 5614, terminal 5622, and terminal 5666 of FIG. 5c serve as Input/Output (I/O) terminals 5722, 5724, and 5726 of device 5720 of FIG. 7a, respectively. Rectangular 5728 illustrated by a broken line may schematically represent a package containing device 5720, through which I/O terminals 5722, 5724, and 5726 of device 5720 pass through.

Figure 7B:
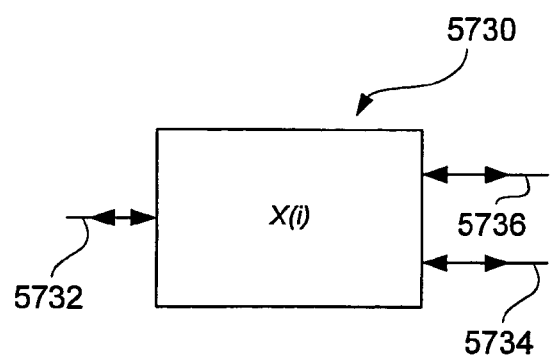

FIG. 7b is a block diagram illustration 5730 of device 5720 of FIG. 7a having I/O terminals 5732, 5734 and 5736 corresponding to terminals 5722, 5724, and 5726 of device 5720 of FIG. 7a, respectively. Device 5730 is characterized by parameter X(i) indicating the amount of displacement of amplifier 5626 of FIG. 5c from midpoint 5628 of FIG. 5c as illustrated by FIG. 7a. Positive and negative symbols may be added to parameter X(i) to indicate that the displacement of amplifier 5626 from mid point 5628 is in clockwise or counterclockwise directions, respectively. The different distance values accepted by displacement parameter X(i) are discussed in details below.

Figure 8:
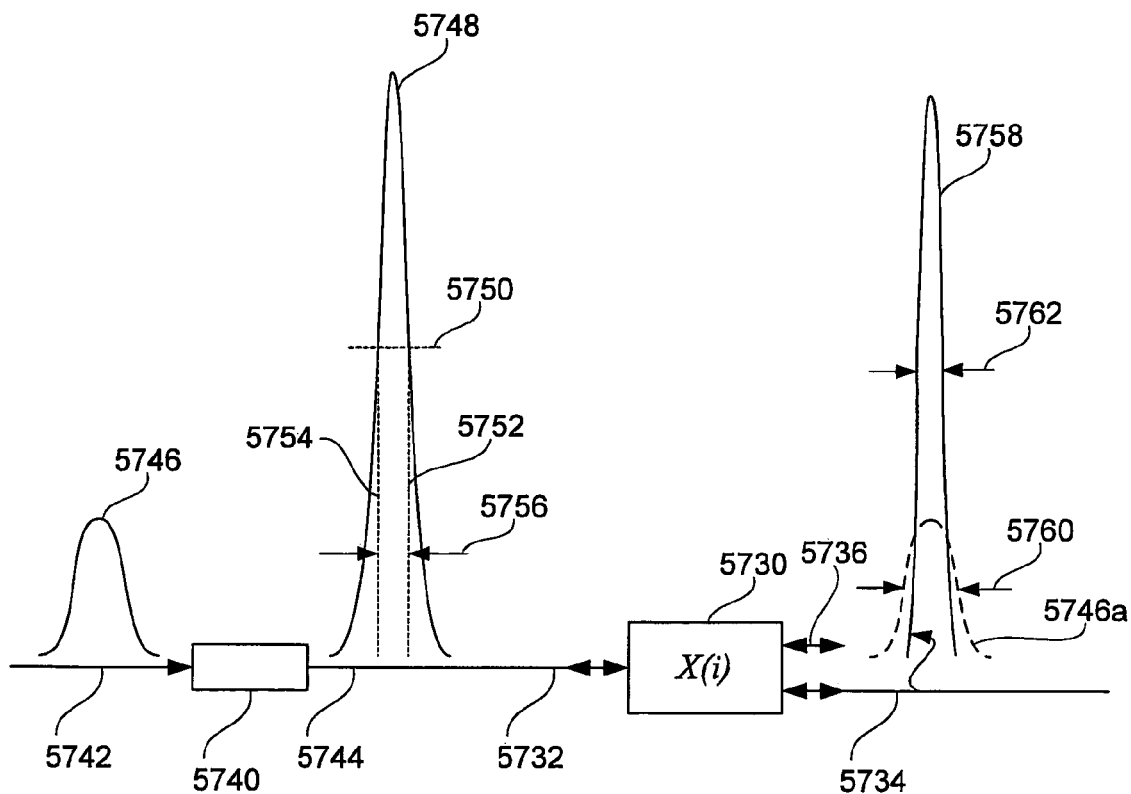
FIG. 8 is an illustration of an all-optical chopper including a threshold device.

2.2. All Optical Conversion of Wide Pulses into Narrow Pulses Using Threshold Device FIG. 8 shows device 5730 used as a threshold device for converting wide pulses into narrow pulses. I/O terminals 5732 and 5734 of device 5730 are used as input and output, respectively. I/O terminal 5736 may not be in use. This way of using device 5730 is analog to threshold device 5300 of FIG. 1a where I/O terminals 5732 and 5734 are functionally analog to input 5304 and output 5306, of FIG. 1a, of threshold device 5300, respectively. An optical amplifier 5740 may be used to amplify the signals going to terminal 5732 of device 5730. Amplifier 5740 receives, at its input 5742, signal 5746 and amplifies signal 5746 to produce, at its output 5744, signal 5748. Device 5730 receives signal 5748, at its input terminal 5732, and transmits signal 5748 to its output terminal 5734 to produce there signal 5758 with accordance to the threshold transmission function between input terminal 5732 and output terminal 5734. The threshold level of device 5730 is schematically illustrated by broken line 5750 on pulse 5748. Under optimal conditions, device 5730 only transmits, from its input 5732 to its output 5734, the unchanged (shape and amplitude) part of signal 5748 that is above threshold level 5750. The part of signal 5748 transmitted by device 5730 to its output 5734, is the unchanged part that is confined between broken lines 5752 and 5754 spaced by the amount indicated by width 5756. Accordingly, the maximum width of signal 5758 at output 5734 should not exceed width 5756. In practice, the threshold transmission function of device 5730 may differ from an ideal step function and the response time of the NLE in device 5730 may produce a corresponding rise time, resulting in an output signal 5758, of which its Full Width Half Maximum (FWHM) 5762 may be equal to or slightly vary (narrower or wider) from width 5756. The amplitude of signal 5758 might be equal or different than the amplitude of signal 5748, depends on the total net amplification at device 5730 (the product G·A, of amplifier 5316 gain G, and attenuator 5314 attenuation A, of device 5300 of FIG. 1*a*, respectively). Signal 5746*a* is an exact copy of signal 5746, illustrated by a broken line, at output terminal 5734, only for the purpose of comparison between the wide initial width 5760, measured at signal 5746*a* FWHM, of input signal 5746 and the narrow final width 5762 of output signal 5758. The final width 5762 of output signal 5758 can be adjusted by varying threshold level 5750 of device 5730, the net gain of device 5730, and the amplification of optical amplifier 5740. The closer the threshold level 5750 is to the peak of signal 5748, the narrower the width 5762 of signal 5758 will be. Though pulse 5758 loses part of its energy by the threshold process of device 5730, that blocks the low intensity parts of input signal 5748, the total intensity of output pulse 5758, boosted by the gain of amplifier 5740 and/or by the net gain of device 5730, may be higher than the input intensity of pulse 5746.

2.3. All Optical Chopping and Re-shaping of Pulses Using Modular Units

FIGS. 9*a*–9*d* are schematic illustrations of the propagation of pulses 5770 and 5772 along part 5774. Part 5774 is a blowup of a segment of loop 5618 of FIG. 7*a*, thus the numeral references of loop 5618, NLE 5626 and mid-point 5628 are the same as of FIG. 7*a*. Part 5774 is a segment of complete loop 5618 of FIG. 7*a* and is schematically illustrated as a strait line. The clockwise and the counterclockwise propagation directions are illustrated by arrows 5776 and 5778, respectively. Small amplitude pulse 5770 and large amplitude pulse 5772 propagating clockwise and counterclockwise, respectively, along loop 5618 are the analog of FIG. 7*a*'s clockwise and counterclockwise split components of a single pulse, such as, pulse 5639 split into two components, such as, 5639A and 5639B, by coupler 5620, while entering loop 5618 of device 5603 of FIG. 7*a*. The amplitude of signal 5770 is smaller than the amplitude of pulse 5772 since the amplitudes of signals 5770 and 5772 are shown post and prior to the attenuation of attenuator 5668 of FIG. 7*a*, respectively.

Large amplitude 5772, small amplitude 5770, and NLE 5626 of FIGS. 9*a*–9*d* and 10*a*–10*c* are adjusted to produce the following situations:

1. The phase change that large amplitude 5772 experiences when passing through NLE 5626 is about π radians.
2. The phase change that small amplitude 5772 experiences when passing through NLE 5626 is very small and practically can be ignored.
3. When large and small amplitudes 5772 and 5770, respectively, overlap each other (in their entirety or partially), the over lapped part of both amplitudes (the small and the large amplitude) experiences a phase change of about or radians.

Figure 9A:
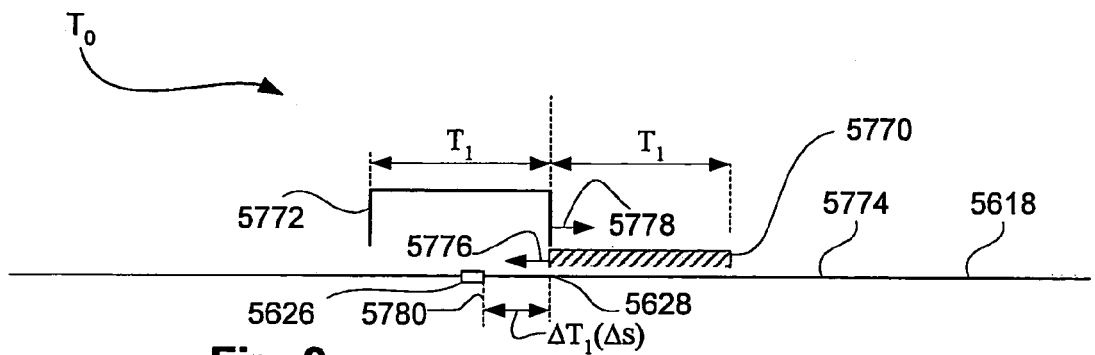
FIGS. 9a–9d illustrate different positions of optical components propagating in a part of optical loops including NLE positioned to the left of the optical loop mid-point.

FIG. 9*a* illustrates the propagation position of pulses 5770 and 5772 at a time defined as $T_0$ in which the leading edge of pulses 5770 and 5772 having both time width $T_1$ meet at mid point 5628 of loop 5618. NLE 5626 is located, on loop 5618, at a distance ΔS left to mid point 5628. Distance ΔS corresponding to a travel time $\Delta T_1$ which is the time that takes pulse 5770 to travel, at direction 5776, from mid point 5628 to the right edge of NLE 5626 indicated by broken line 5780. The relationship between $\Delta T_1$ and ΔS is given by:

$$\Delta T_1(\Delta S) = \Delta S \cdot n / C$$

where C is the speed of light in vacuum and n is the refractive index of the media from which loop 5618 is made of.

Figure 9B:
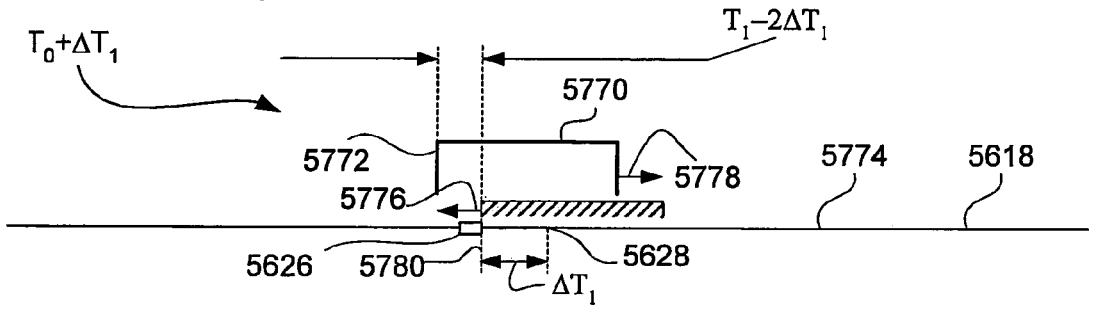

FIG. 9*b* illustrates the positions of pulses 5770 and 5772 at time $T_0 + \Delta T_1$ ($\Delta T_1$ after $T_0$). At this time, pulse 5770 reaches line 5780, after traveling a distance ΔS in the clockwise direction, along arrow 5776, from its previous position at mid point 5628 corresponding to its position at time $T_0$ as shown in FIG. 9*a*. At the same time, pulse 5772 is displaced by a distance ΔS, in the counterclockwise direction, along arrow 5778, from its previous position at midpoint 5628 corresponding to its position at time $T_0$ as illustrated by FIG. 9*a*. Accordingly, the time space between the leading edge of pulse 5770 and the trailing edge of pulse 5772 is reduced from $T_1$ at time $T_0$ (FIG. 9*a*) to $T_1 - 2 \cdot \Delta T_1$ at time $T_0 + \Delta T_1$ (FIG. 9*b*). Broken line 5780 also indicates the position where pulses 5770 and 5772 start to overlap each other on NLE 5626.

Figure 9C:
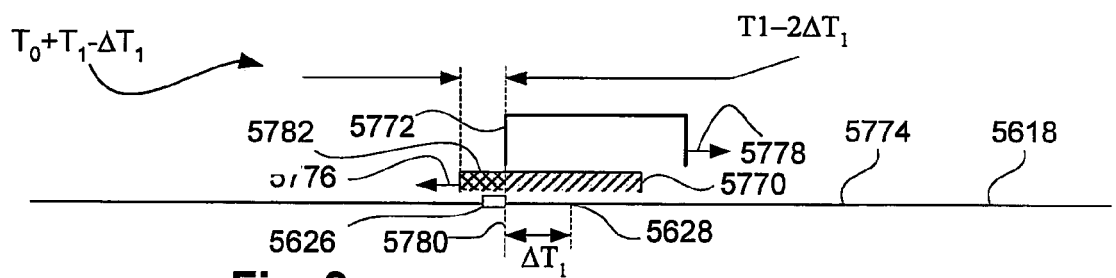

FIG. 9*c* illustrates the position where the trailing edge of pulse 5772 crosses line 5780 and exits from NLE 5626 at time $T_0 + T_1 - \Delta T_1$ and after traveling a time $T_1 - 2 \cdot \Delta T_1$ relative to the position illustrated by FIG. 9*b*. During the transition from the position illustrated by FIG. 9*b* to the position illustrated by FIG. 9*c*, pulse 5770 travels along a time interval that also equals to $T_1 - 2 \cdot \Delta T_1$ and the overlapping between pulses 5770 and 5772 on NLE 5626 lasts for $T_1 - 2 \cdot \Delta T_1$. From this position there is no more overlapping between pulses 5770 and 5772 on NLE 5626. Accordingly, during the $T_1 - 2 \cdot \Delta T_1$ time period 5782, the phase of small amplitude pulse 5770 is changed, due to the simultaneous overlapping of large amplitude pulse 5772, small amplitude pulse 5770 and NLE 5626.

Figure 9D:
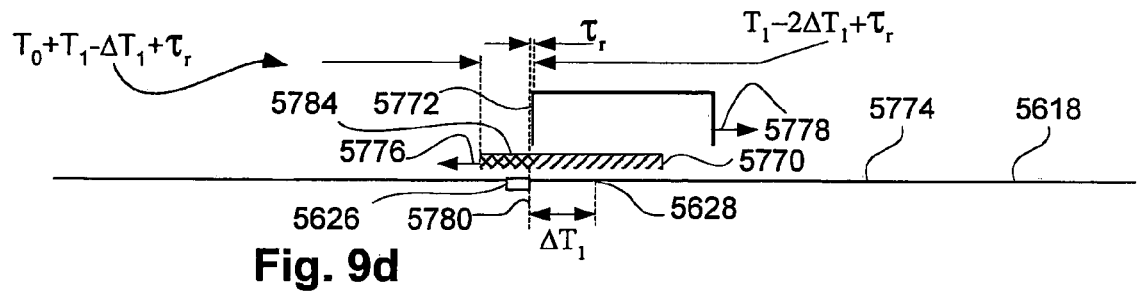

FIG. 9*d* illustrates a situation at time $T_0 + T_1 - \Delta T_1 + \tau_r$, and when the recovery time $\tau_r$ of NLE 5626 may be significant relative to the width $T_1$ of pulses 5770 and 5772. In this case, the influence of pulse 5772 on NLE 5626 and thus on the phase of pulse 5770 lasts for an additional time period $\tau_r$ after the exit of the trailing edge of pulse 5772 from NLE 5626. Accordingly, the influence of large amplitude pulse 5772 on the phase of small amplitude pulse 5770 last for $T_1 - 2 \cdot \Delta T_1 + \tau_r$ as indicated by time interval 5784.

It should be appreciated from the illustrations of FIGS. 9*a*–9*d* that simultaneous overlapping between large amplitude pulse 5772, small amplitude pulse 5770 and NLE 5626 can be achieved only if $\Delta T_1 < T_1 / 2$. Similar result can be derived from relation $T_1 - 2 \cdot \Delta T_1 + \tau_r$ using the fact that the influence time 5784 of large amplitude pulse 5772 on the phase of small amplitude pulse must be positive. Accordingly, $\Delta T_1$ should be less than $(T_1 + \tau_r)/2$.

Practically, for the most applications used today, $\tau_r$ can be ignored and thus $\Delta T_1$ corresponds to a ΔS that is less than half of the spatial width ($T_1 \cdot C / n$) of pulses 5770 and 5772.

FIGS. 9*a*–9*b* illustrate a situation in which the phase of the leading part of small amplitude pulse 5770 is affected by the large amplitude pulse 5772. A similar situation, in which the phase of a trailing part of small amplitude pulse 5770 is affected by the large amplitude pulse 5772, is illustrated by FIGS. 10*a*–10*c*.

Figure 10A:
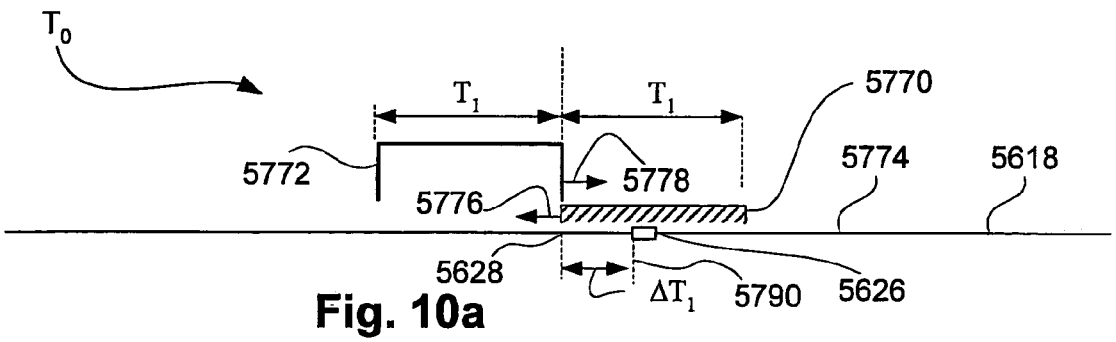
FIGS. 10a–10c illustrate different positions of optical components propagating in a part of optical loops including NLE positioned to the right of the optical loop mid-point.
Figure 10B:
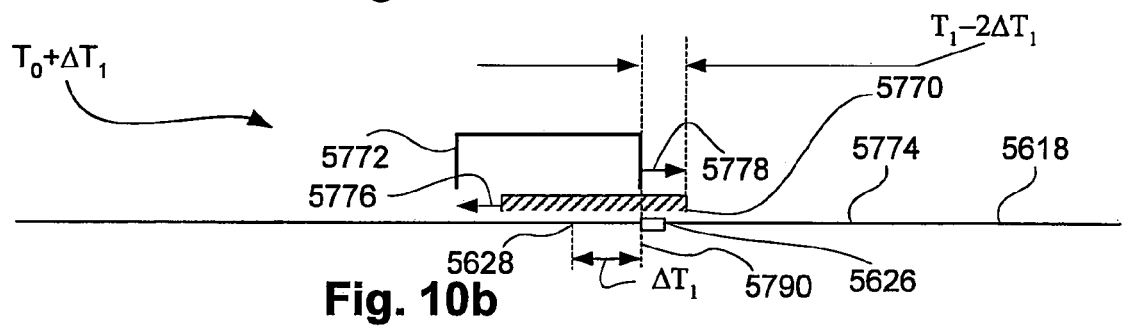
Figure 10C:
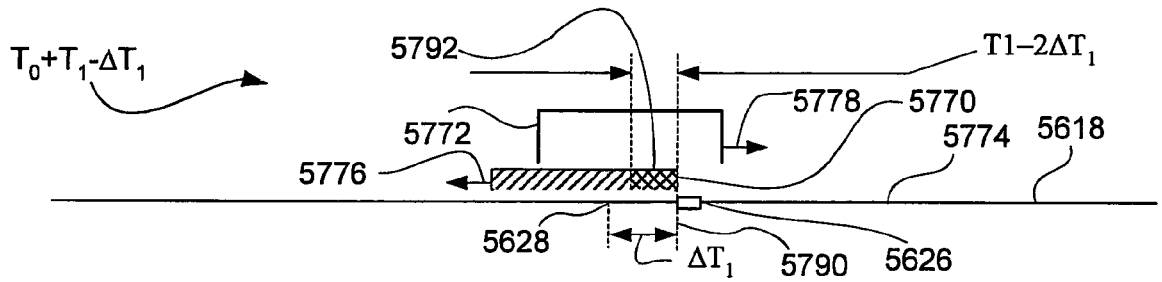

FIGS. 10*a*–10*c* illustrate situations similar to the situations shown in FIGS. 9*a*–9*d*. Accordingly, same referral numerals are used for same structures, directions, and pulses. Unlike FIGS. 9*a*–9*d*, in which NLE 5626 is displaced to the left (clockwise) of mid point 5628, FIGS. 10*a*–10*c* illustrate the situation in which NLE 5626 is displaced to the right (counterclockwise) of mid point 5628.

FIG. 10*a* illustrates the propagation position of pulses 5770 and 5772 at a time defined as $T_0$ in which the leading edge of pulses 5770 and 5772 having time width $T_1$ meet at mid point 5628 of loop 5618. NLE 5626 is located on loop 5618 at a distance $\Delta S$ to the right of mid point 5628. Distance $\Delta S$ corresponding to a travel time $\Delta T_1$ which is the time it takes pulse 5772 to travel from mid point 5628 to the left edge of NLE 5626 indicated by broken line 5790. The relationship between $\Delta T_1$ and $\Delta S$ are given by:

$$\Delta T_1(\Delta S) = \Delta S \cdot n / C$$

where C is the speed of light in vacuum and n is the refractive index of the media from which loop 5618 is made of.

FIG. 10*b* illustrates the positions of pulses 5770 and 5772 at time $T_0 + \Delta T_1$ ($\Delta T_1$ after $T_0$). At this time, pulse 5772 reaches line 5790 after traveling a distance $\Delta S$ in the counterclockwise direction, along arrow 5778, from its previous position at mid point 5628 corresponding to its position at time $T_0$ as shown in FIG. 10*a*. At the same time, pulse 5770 is displaced by a distance $\Delta S$, in the clockwise direction, along arrow 5776, from its previous position at midpoint 5628 corresponding to its position at time $T_0$ as illustrated by FIG. 10*a*. Accordingly, the time space between the leading edge of pulse 5772 and the trailing edge of pulse 5770 is reduced from $T_1$ at time $T_0$ (FIG. 10*a*) to $T_1 - 2 \cdot \Delta T_1$ at time $T_0 + \Delta T_1$ (FIG. 10*b*). Broken line 5790 also indicates the position where pulses 5772 and 5770 start to overlap each other on NLE 5626.

FIG. 10*c* illustrates the position where the trailing edge of pulse 5770 crosses line 5790 and exits from NLE 5626 at a time $T_0 + T_1 - \Delta T_1$ and after traveling a time $T_1 - 2 \cdot \Delta T_1$ relative to the position illustrated by FIG. 10*b*. During the transition from the position illustrated by FIG. 10*b* to the position illustrated by FIG. 10*c*, pulse 5772 travels along a time interval that also equals to $T_1 - 2 \cdot \Delta T_1$ and the overlapping between pulses 5772 and 5770 on NLE 5626 lasts $T_1 - 2 \cdot \Delta T_1$. From this position there is no more overlapping between pulses 5772 and 5770 on NLE 5626. Accordingly, during the $T_1 - 2 \cdot \Delta T_1$ time period 5792, the phase of small amplitude pulse 5770 is changed, due to the simultaneous overlapping of large amplitude pulse 5772, small amplitude pulse 5770 and NLE 5626.

Unlike the situations illustrated by FIGS. 9*a*–9*d*, where region 5782 is broaden by the recovery time $\tau_r$ of NLE 5626 to be region 5784, as shown by FIG. 9*d*, there is no such broadening in the situation illustrated by FIG. 10*c*. Such broadening does not exist in this situation, where NLE 5626 is located to the right of mid point 5628, since the lower amplitude pulse 5770 is the one that exits first from NLE 5626 and its phase can not be affected any more by larger amplitude pulse 5772 and NLE 5626.

For the same reasons explained above for the situations of FIGS. 9*a*–9*d*, it should be appreciated that a phase change of a part of small amplitude pulse 5770 can be achieved by simultaneous overlapping between large amplitude pulse 5772, small amplitude pulse 5770 and NLE 5626 only if $\Delta T_1 < T_1/2$. Accordingly, $\Delta T_1$ should be less than $T_1/2$ corresponding to a $\Delta S$ that is less than half of the spatial width ($T_1 \cdot C/n$) of pulses 5770 and 5772.

FIGS. 10*a*–10*c* illustrate a situation in which the phase of the trailing part of small amplitude pulse 5770 is affected by the large amplitude pulse 5772.

FIGS. 9*a*–9*d* and 10*a*–10*c* illustrate clockwise and counterclockwise split components, respectively, of the same pulse that enters loop 5618, which their leading edges meet at midpoint 5628 of loop 5618. However, this is not the only situation in which the phase of a part of the small amplitude pulse can be changed. FIGS. 10*d*–10*g* illustrate additional situations in which the optical pulses can be chopped where the location of NLE 5626 is different from midpoint 5628.

FIGS. 10*d*–10*g* illustrate split streams of small and large amplitudes of optical components 5900A and 5900B including streams of pulses 5901A–5904A and 5901B–5904B propagating clockwise and counter clockwise in loop 5618, respectively. The referral numerals of components 5901A–5904A and 5901B–5904B are also the indices of these components indicating the order of their arrival. Streams 5900A and 5900B are the optical components, in loop 5618, of a stream of pulses (not shown) that enter loop 5618 and split there into its components 5900A and 5900B. When a stream of equally spaced pulses, having time period $T_2$, enters loop 5618, each of the pulses in the stream is split into clockwise and counterclockwise components to produce streams of optical components 5900A and 5900B, respectively. P(i) are the meeting points between the leading edges of a certain pulse out of the pulse components 5901A–5904A of stream 5900A and another pulse out of the pulse components 5901B–5904B of stream 5900B. Points P(i) are the meeting points to the left of midpoint P(0) and meeting points –P(i) are the meeting points to the right of mid point P(0).

Figure 10D:
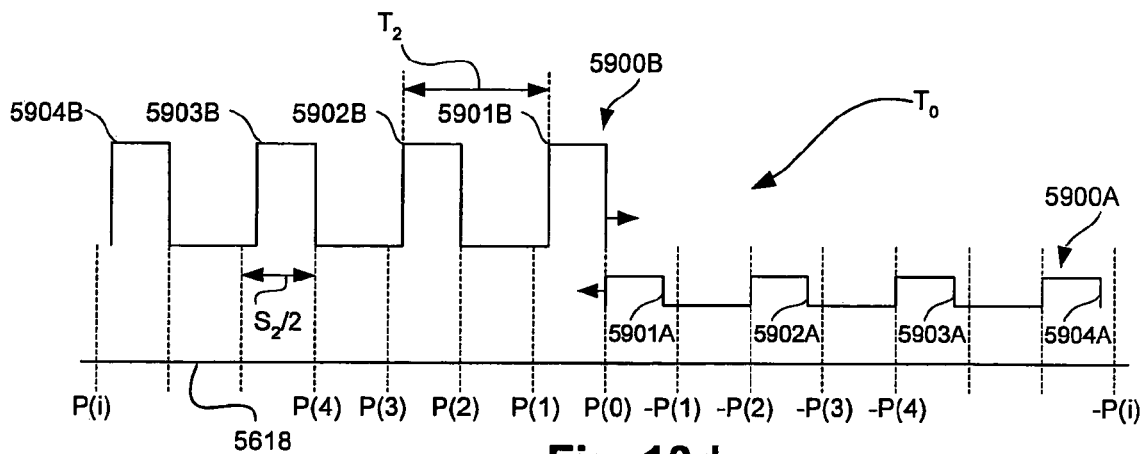
FIGS. 10d–10g illustrate various meeting points, in an optical loop, between the optical components of a pulse stream that enters the loop and is split there into its optical components.

FIG. 10*d* illustrates a situation that occurs at a time defined as $T_0$ in which Components 5901A and 5901B of the same pulse meet at mid point P(0) (corresponding to midpoint 5628, as illustrated by FIGS. 9*a*–9*d* and 10*a*–10*c*).

Since pulse-streams 5900A and 5900B travel at opposite directions, their pulses will meet every time period that is equal to half of the time space $T_2$ between their pulses. Accordingly, the components of different pulses meet every time period of $T_2/2$ corresponding to integral number of half of the spatial distance $S_2$ between the pulses. $S_2$ is given by:

$$S_2 = T_2 \cdot C / n$$

where C is the speed of light in vacuum and n is the refractive index of the media from which loop 5618 is made of.

Accordingly, for continuous and equally spaced pulse stream, at every distance $P(i) = i \cdot S_2/2 = i \cdot T_2 \cdot C/(2 \cdot n)$, there is a meeting point between the components of different pulses, where i is an integral number and may be equal to 0,1,2,3, . . . As explained below, the index i also indicates that the meeting at point P(i) is between the split components of different pulses in loop 5618 related to pulses that enter into loop 5618 and are separated by i pulses. For index i=0, there is no separation between the pulses and the components that meet are related to the same pulse and meet at P(0)=0 which is mid point 5628 as illustrated by FIG. 10*d*. For i=2, for example, the components that meet are related to non-adjacent pulses (separated by one pulse) and meet at $P(2) = 2 \cdot S_2/2 = 2 \cdot T_2 \cdot C/(2 \cdot n)$.

An example for i=1 is illustrated by FIGS. 5*a*–5*c* in which the components of the first pulse meet the component of the second pulse at a distance $P(1) = 1 \cdot S_2/2 = 1 \cdot T_2 \cdot C/(2 \cdot n)$ left to midpoint 5628.

Figure 10E:
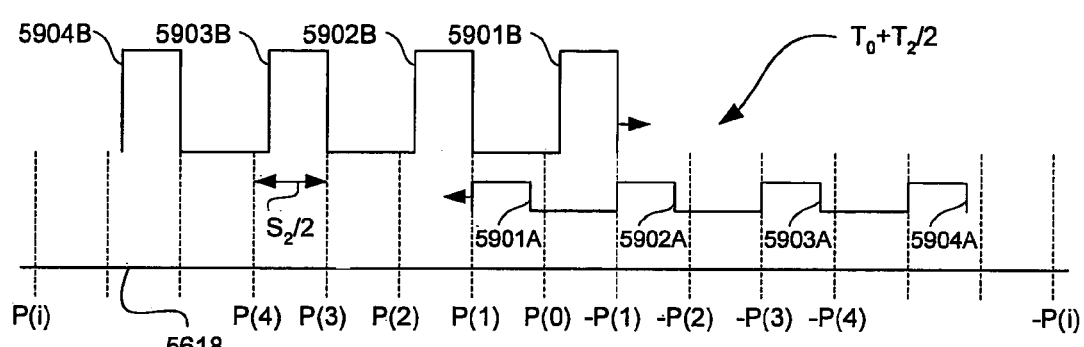

FIG. 10*e* illustrates a situation at time $T_0 + T_2/2$ which is $T_2/2$ after the situation illustrated by FIG. 10*d*. FIG. 10*e* shows that components 5901A and 5902B meet at point P(1) and components 5901B and 5902A meet at point –P(1). It can be seen that when the index of the meeting point is i=1, the indices of the components that meet at point P(1) and –P(1) are also different by 1.

Figure 10F:
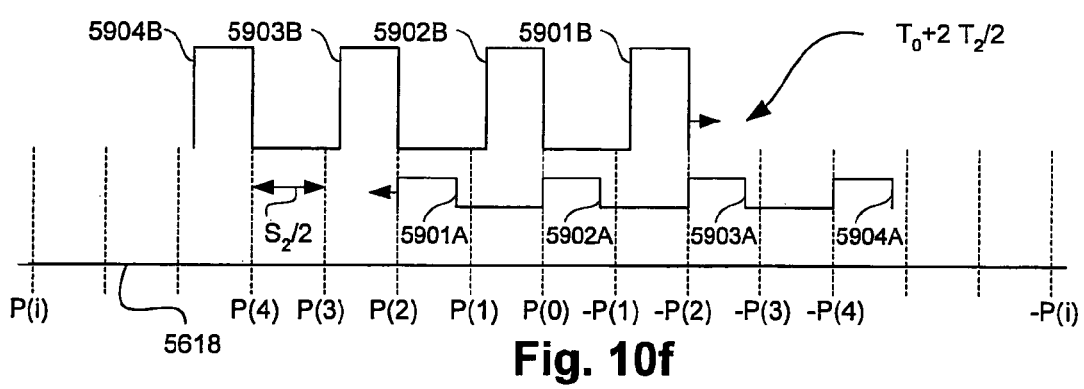

FIG. 10*f* illustrates a situation at time $T_0 + 2 \cdot T_2/2$ which is $2 \cdot T_2 2$ after the situation illustrated by FIG. 10*d*. FIG. 10*f* shows that components 5903B and 5901A meet at point P(2), components 5901B and 5903A meet at point –P(2), and components 5902B and 5902A meet at point P(0). It can be seen that when the index of the meeting point is i=2, the indices of the component that meet at point P(2) and –P(2) are also different by 2 and when i=0, the components that meet at P(0) has the same index.

Figure 10G:
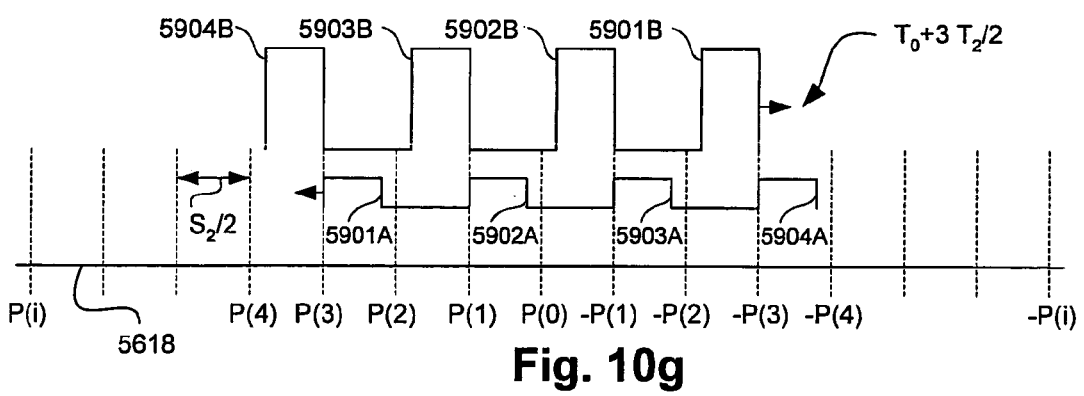

FIG. 10g illustrates a situation at time $T_0+3\cdot T_2/2$ which is $3\cdot T_2/2$ after the situation illustrated by FIG. 10d. FIG. 10g shows that components 5904B and 5901A meet at point P(3), components 5901B and 5904A meet at point –P(3), components 5903B and 5902A meet at point P(1), and components 5902B and 5903A meet at point –P(1). It can be seen that when the index of the meeting point is i=3, the indices of the component that meet at point P(3) and –P(3) are also different by 3 and when i=1, the indices of the components that meet at P(1) are different by 1.

In general, for any meeting point P(i), the indices of the components that meet there are different by the amount i.

For the purpose of producing a phase shift only to a part of small amplitude signal, such as signal 5770, any meeting point P(i) is equivalent to mid point 5628 of FIGS. 9a–9d and 10a–10c. Accordingly, the situations illustrated by FIGS. 9a–9d and FIGS. 10a–10c can be achieved when NLE 5626 would be placed at a distance ΔS to the left and to the right of any meeting point, respectively.

Distance X(i) of NLE 5626 from midpoint 5628 may be measured in clockwise or counterclockwise directions and accordingly may get a positive or negative symbol, respectively. The corresponding displacement distance X(i) of amplifier 5626 to the left or to the right (clockwise or counterclockwise) of mid point 5628 is given by:

$$X(i)=P(i)+\Delta S=i\cdot S_2/2+\Delta S=i\cdot T_2\cdot C(2\cdot n)+\Delta T_1\cdot C/n$$

For clarification, it should be noted that described distance X(i) is the parameter characterizing devices 5710 and 5730 of FIGS. 6b and 7b, respectively.

2.3.1 All Optical Head and Tail Chopping

Figure 11A:
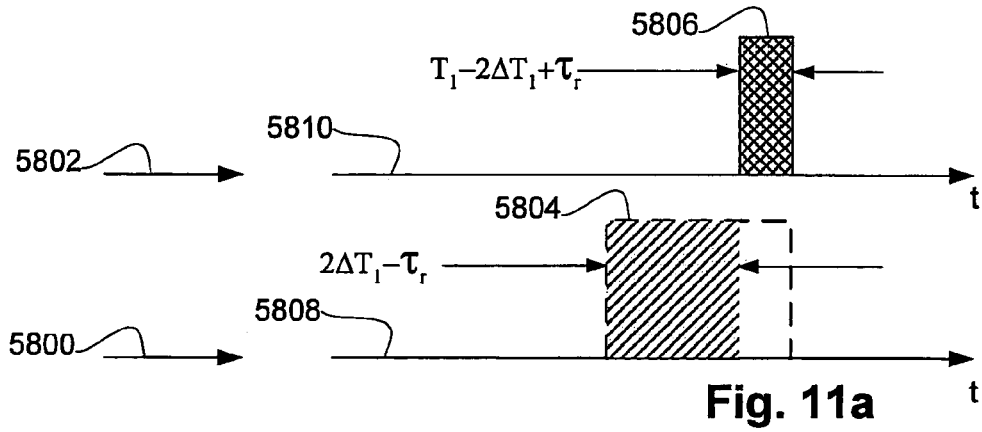
FIG. 11a illustrates the reshaped pulses produced at the outputs of an optical chopper.
Figure 11B:
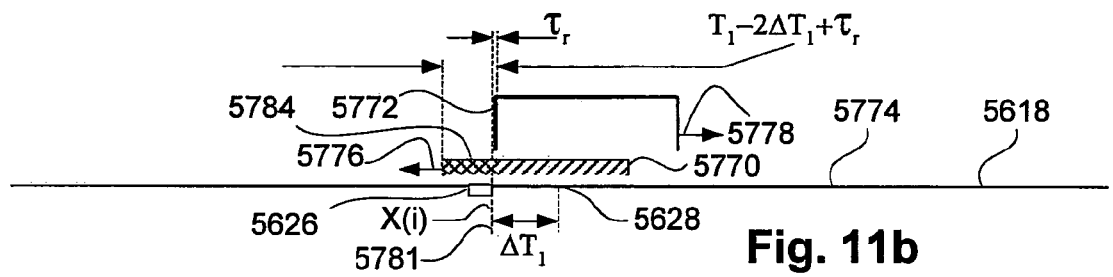
FIG. 11b illustrates the position of the optical components propagating in the loop of the optical chopper shown in FIG. 11a including NLE positioned to the left of the optical loop mid-point.

Referring to FIGS. 11a, 11b, 1a, 7a, and 7b. FIG. 11b illustrates a situation similar to the situation illustrated by FIG. 9d and is accompanied to FIG. 11a to ease the understanding of the correlation between the situation shown in FIG. 11b (or 9d) and the signals at terminals 5304 and 5306 of FIG. 1a, terminals 5724 and 5726 of FIG. 7a, and terminals 5734 and 5736 of FIG. 7b. Terminals 5306, 5724, and 5734 of FIGS. 1a, 7a, and 7b, respectively, are schematically illustrated by terminal 5800 of FIG. 11a. Terminals, 5304, 5726, and 5736 of FIGS. 1a, 7a, and 7b, respectively, are schematically illustrated by terminal 5802 of FIG. 11a.

FIG. 11b is similar to FIG. 9d with the exception of the location 5780 of NLE 5626 of FIG. 9d is replaced by any location X(i) indicated as 5781 in FIG. 11b. The location X(i) (or 5781) of FIG. 11b coincides with location 5780 of NLE 5626 of FIG. 9d for index i=0. Accordingly, the same referral numerals are used for the same structures and signals in both, FIG. 9d and FIG. 11a.

As illustrated by FIGS. 1a, 7a, and 7b and explained in their accompanied descriptions, under certain conditions listed below, devices 5300, 5720, and 5730 may completely transmit to their outputs 5306, 5724, and 5734 the energy of the input signals received at their inputs 5304, 5722, and 5732, respectively. The total energy transmission between inputs 5304, 5722, and 5732 and outputs 5306, 5724, and 5734 of devices 5300, 5720, and 5730, respectively, occurs under the following conditions:

1. The input signal is large enough to produce a large amplitude component in the loop (such as component 5772 of loop 5618 of FIG. 11b) that the phase of this large component is shifted, by the NLE in the loop (such as NLE 5626 of FIG. 11b), by π radians.
2. The small amplitude component in the loop (such as component 5770 of loop 5618 of FIG. 11b) is small enough that the shift of its phase produced by the NLE in the loop (such as NLE 5626 of FIG. 11b) is practically negligible.
3. There is no simultaneous overlapping between the large optical component, the small optical component, and the NLE in the loop (such as optical components 5772, 5770, and NLE 5626 of loop 5618 of FIG. 11b, respectively, but, unlike the illustrated by FIG. 11b, the pulses, such as, pulses 5772 and 5770 do not overlap each other on NLE 5626)

Accordingly, when conditions 1 and 2 are fulfilled for the situation schematically illustrated by FIG. 11b, the non overlapped part of optical component 5770 and 5772 having a time width of $2\cdot\Delta T_1-\tau_r$ will produce signal 5804 at terminal 5800, both of FIG. 11a, also having a time width of $2\cdot\Delta T_1-\tau_r$.

Under the same conditions except for condition number 3 that is changed to be:
3. There is simultaneous overlapping between the large optical component, the small optical component, and the NLE in the loop (such as optical components 5772, 5770, and NLE 5626 of loop 5618 of FIG. 11b, respectively).

the complete energy of the optical components in the loop (such as components 5770 and 5772 of loop 5618 of FIG. 11b) is reflected back from the loop (after net amplification or attenuation) to the input terminal and appears at terminals 5304, 5726, and 5736 of FIGS. 1a, 7a, and 7b, respectively.

Accordingly, when conditions 1 and 2 are fulfilled for the situation schematically illustrated by FIG. 11a, the overlapped part of optical component 5770 and 5772 having a time width of $T1-2\cdot\Delta T_1+\tau_r$ will produce signal 5806 at terminal 5802, both of FIG. 11b, also having a time width of $T1-2\cdot\Delta T_1+\tau_r$.

Signals 5804 and 5806 of FIG. 11a are illustrated on time axes 5808 and 5810, respectively, to illustrate the time sequence of their appearance. Pulse 5806 appears first since the phase change of component 5770 of FIG. 11b occurs at the leading part of component 5770. Pulse 5804 follows pulse 5806 with no time gap between them and the total sum of their time width equals to the time width $T_1$ of components 5770 and 5772 of FIG. 11b. Time width $T_1$ also equals to the time width of the input signals received at terminals 5722 and 5732 of devices 5720 and 5730 of FIGS. 7a and 7b, respectively.

Figure 12A:
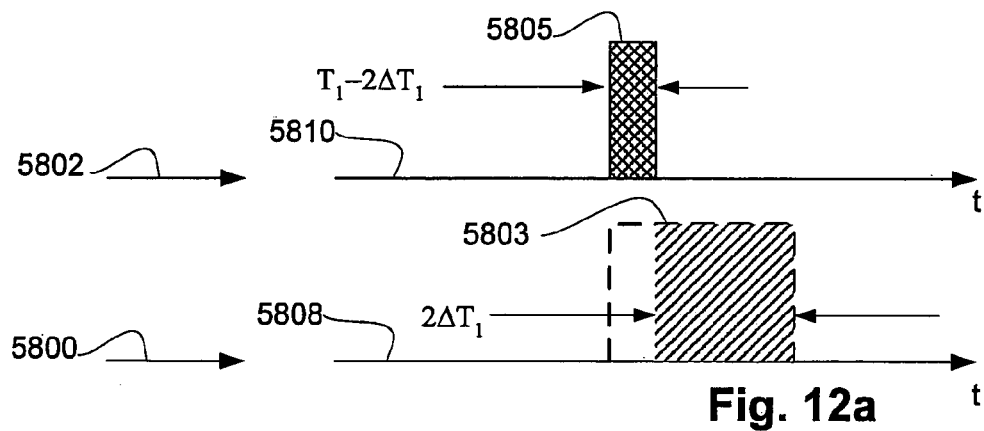
FIG. 12a illustrates the reshaped pulses produced at the outputs of an optical chopper designed according to another aspect of the invention.
Figure 12B:
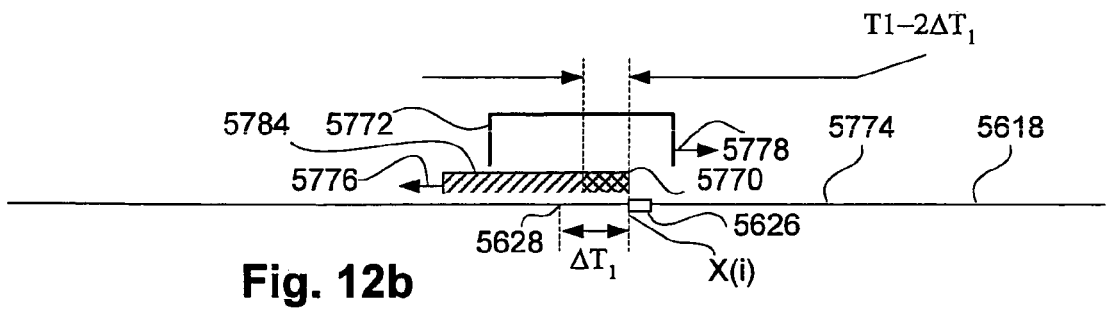
FIG. 12b illustrates the position of the optical components propagating in the loop of the optical chopper shown in FIG. 12a including NLE positioned to the right of the optical loop mid-point.

Referring to FIGS. 12a and 12b, illustrating situations similar to the situations illustrated by FIGS. 11a and 11b and thus the same referral numerals are used in FIGS. 11a, 11b, 12a, and 12b for the same structures and signals. The position X(i) of NLE 5626 was moved from being to the left of mid point 5628 in FIG. 11b to be to the right of mid point 5628 in FIG. 12b. For index i=0, X(i) coincides with the position 5790 of NLE 5626 in FIG. 10c. FIG. 12b illustrates a situation analog to the situation illustrated by FIG. 10c and is accompanied to FIG. 12a to ease the understanding of the correlation between the situation shown in FIG. 12b (or 10c) and the signals at terminals 5306 of FIG. 1a, terminals 5724 and 5726 of FIG. 7a, and terminals 5734 and 5736 of FIG. 7b.

From the analogy of FIGS. 12a and 12b to FIGS. 11a and 11b, it is clear that when the above mentioned conditions 1 and 2 are fulfilled for the situation schematically illustrated by FIG. 12b, the non overlapped part of optical component 5770 and 5772 having a time width of $2 \cdot \Delta T_1$ will produce signal 5803 at terminal 5800 also having a time width of $2 \cdot \Delta T_1$. Similarly, when the above conditions 1 and 2 are fulfilled for the situation schematically illustrated by FIG. 12b, the overlapped part of optical component 5770 and 5772 having a time width of $T_1 - 2 \cdot \Delta T_1$ will produce signal 5805 at terminal 5802 also having a time width of $T_1 - 2 \cdot \Delta T_1$.

Signals 5803 and 5805 of FIG. 12a are illustrated on time axes 5808 and 5810, respectively, to illustrate the time sequence of their appearance. Pulse 5805 appears last since the phase change of component 5770 of FIG. 12b occurs at the trailing part of component 5770. Pulses 5805 follows pulse 5803 with no time gap between them and the total sum of their time width equals to the time width $T_1$ of components 5770 and 5772 of FIG. 12a. Time width $T_1$ also equals to the time width of the input signals received at terminals 5722 and 5732 of devices 5720 and 5730 of FIGS. 7a and 7b, respectively.

As can be seen, pulses 5803 and 5805 and pulses 5804 and 5806 produced at terminals 5800 and 5802 of FIGS. 11a and 12a, respectively, are narrower than the original input signal having width of $T_1$. The width of the signals at terminals 5800 and 5802 can be adjusted by the position X(i) of NLE 5626 corresponding to $\Delta T_1$. Signals 5803 and 5804 produced at port 5800 are the signals that produced above threshold and thus have discrimination of low amplitude signals produced by the threshold mechanism. Signals 5805 and 5806 produced at port 5802 are the signals that produced by reflection back from loop 5618 and thus do not have discrimination of signal amplitudes by the threshold mechanism. Accordingly, the use of signals 5803 and 5804 from terminal 5800 has the advantage of enhancing the Signal to Noise Ratio (SNR) by blocking lower level noise signals.

For most of the practical purposes used today, $\tau_r$ can be ignored and then signals 5804 and 5803 of FIGS. 11a and 12a, respectively, have a constant width that depends only on the parameter X(i) corresponding to $\Delta T_1$, regardless of the input signal width. In this situation, signal 5806 of FIG. 11a is chopped at its trailing edge by the amount of $2 \cdot \Delta T_1$ and signal 5805 of FIG. 12a is chopped at its leading edge by the amount of $2 \cdot \Delta T_1$.

2.3.2 Optical Self Chopping

It should be appreciated that when the location of NLE 5626 equals to X(0), the process of the pulse chopping is a self chopping and is perform by the overlapping between optical components 5770 and 5772 related to the same pulse. In this case, the self chopping does not depend on the time space $T_2$ between the arriving input signals. However, when the location of NLE 5626 equals to X(i) (i≠0), the process of the pulse chopping is not a self chopping and is performed by the overlapping between optical components 5770 and 5772 related to different pulses. In this case, the chopping depends on the time space $T_2$ between the arriving input signals.

2.3.3 Block Presentation of Various Optical Choppers

Figure 13A:
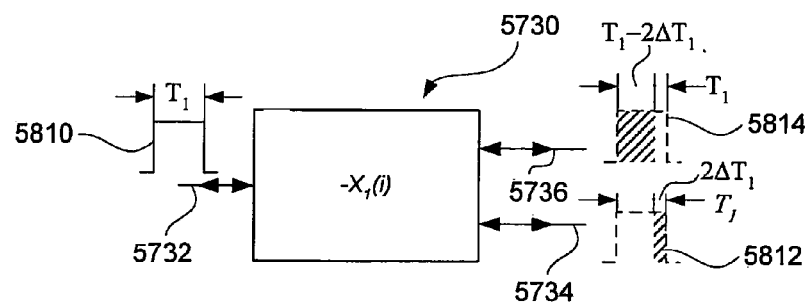
FIGS. 13a–13c illustrate all optical choppers for head, tail, and head and tail chopping.
Figure 13B:
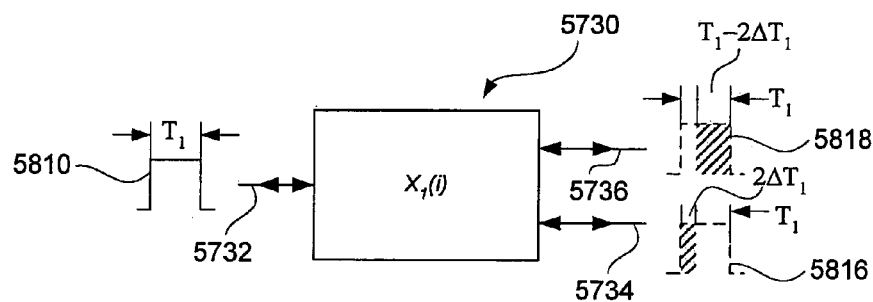

FIGS. 13a–13b illustrate input signal 5810 at input terminals 5732 of devices 5730 and the output signals at their output 5734 and 5746 in accordance with the characterization parameter X(i) of devices 5730. Device 5730 is the schematic block diagram illustrated in FIG. 7b presenting device 5720 shown in FIG. 7a. Parameter X(i) may have a positive or negative symbol to indicate whether NLE 5626 is to the left or to the right of meeting point P(i), respectively.

FIG. 13a shows device 5730 characterized by negative symbol of X(i), thus producing at its outputs 5734 and 5736 signals 5812 and 5814, respectively. These outputs are produced in a way similar to the way that signals 5803 and 5805 are produced at outputs 5800 and 5802 of FIG. 12a, respectively. Similarly, FIG. 13b shows device 5730 characterized by positive X(i), thus producing at its outputs 5734 and 5736 signals 5816 and 5818, respectively. These outputs are produced in a way similar to the way that signals 5804 and 5806 are produced at outputs 5800 and 5802 of FIG. 11a, respectively.

Signal 5814 of FIG. 13a is chopped at its leading edge and its width is reduced by $2 \cdot \Delta T_1$. At the same time the width of signal 5812 is maintained to be $2 \cdot \Delta T_1$, regardless on the width of input signal 5810. Signal 5818 of FIG. 13b is chopped at its trailing edge and its width is reduced by $2 \cdot \Delta T_1$. At the same time the width of signal 5816 is maintained to be $2 \cdot \Delta T_1$, regardless on the width of input signal 5810.

Figure 13C:
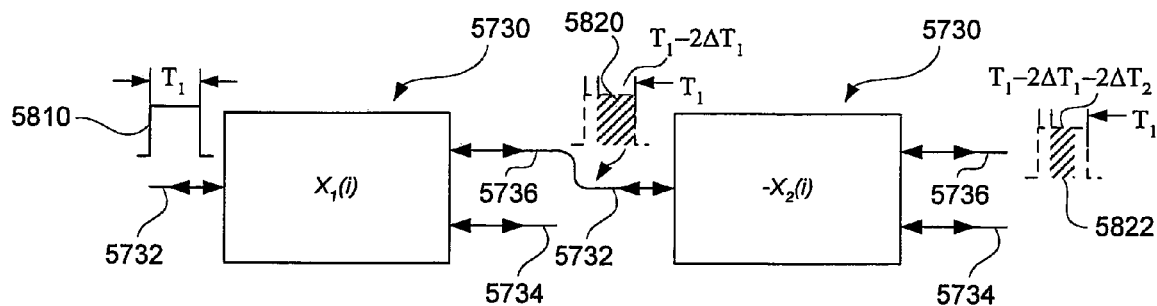

FIG. 13c illustrates a configuration that includes two devices 5730 combined in series and designed for chopping the input pulses 5810 on both leading and trailing edges. The first device 5730 is characterized by positive symbol of $X_1(i)$, thus produceing, at its output 5736, pulse 5820 that is produced in a way similar to pulse 5814 of FIG. 13a and its trailing edge is chopped by amount $2 \Delta T_1$. Pulse 5820 serves as the input signal for second device 5730 characterized by negative symbol of $X_2(i)$, thus producing, at it output 5736, pulse 5822 that is produced in a way similar to pulse 5818 of FIG. 13b and its trailing edge is chopped by amount $2 \cdot \Delta T_2$. Accordingly, pulse 5822 is chopped, relative to input signal 5810, on both its sides, the leading and the trailing sides.

While devices 5730 of FIG. 13c are illustrated by characterization parameters $X_1(i)$ and $-X_2(i)$ which have different absolute values, they also may be equal absolute values if desired 2.3.4. Additional All Optical Choppers Referring to FIGS. 14a and 14b, FIG. 14a illustrates device 5830 that may represent device 5700 of FIG. 6a schematically illustrated by block diagram 5710 of FIG. 6b. Device 5830 is designed to chop pulses by partial overlapping of optical components, such as, components 5770 and 5772 in loop 5618 illustrated by FIGS. 9a–9d, 10a–10c, 11b, and 12b. Since device 5830 does not includes an attenuator in its loop, the input pulses should be constructed by pairs of pulses in which each pair includes a higher and a lower amplitude pulse. The need for two pulses to produce the desired chopped output pulse suggest that device 5830 may not be suitable for self chopping and may be characterized by a parameter X(i) that may get any integral value for i except the value of i=0. The restriction of i≠0 indicates that the pulse chopping mechanism is different from self chopping and is produced by partial overlapping occurred on NLE 5626 and between optical components, such as 5770 and 5772, related to different input pulses. However, FIG. 14a illustrates a design that allows self chopping using device 5830 with index i=0 corresponding to meeting point P(0) that coincides with midpoint 5628.

Input pulse 5832 received at input 5833 is split by coupler 5835 into two pulses 5846 and 5848 propagating along radiation guides 5834 and 5836, respectively. Pulse 5834 is delayed, by delay line 5838, by an amount $\Delta T_2$ to produce delayed pulse 5842. Pulse 5836 is amplified, by amplifier 5840 to produce pulse 5844. Pulses 5842 and 5844 received by terminals 5850 and 5852 of coupler (combiner) 5854, respectively, are combined by coupler 5854 to produce, at its output 5856, combined pulse 5864 propagating along input 5712 of device 5830. Pulse 5864 is the result of summing pulses 5842 and 5844 having different amplitudes shifted in time by $\Delta T_2$ and thus, pulse 5864 is constructed of three different pulses 5858, 5860, and 5862 having three different amplitudes and closely packed. The amplitude of pulse 5858, in pulse 5864, has the same amplitude as pulse 5842, but pulse 5858 is narrower than pulse 5842 (or input pulse 5832) by $\Delta T_2$. The amplitude of pulse 5860, in pulse 5864, is the summing result of the amplitudes of pulses 5842 and 5844 where they overlap each other. The amplitude of pulse 5862, in pulse 5864, equals to the amplitude of pulse 5844. The width of pulse 5862 equals to the delay $\Delta T_2$.

Pulse 5864 is received by device 5830 at its input 5712. The interior of device 5830 is illustrated by FIG. 6a and part of this interior is illustrated by FIG. 14b including a segment of loop 5618 and NLE 5626. Pulse 5864 is split, by loop 5618 into two optical components 5864A and 5864B propagating clockwise and counterclockwise, respectively. As explained in the description for FIG. 5b, corresponding to the structures illustrated by FIGS. 6a and 6b, device 5830 of FIG. 14a behaves as follows:

In the event that there is no overlapping between the optical components (such as components 5864A and 5864B of FIG. 14b) in loop 5618 and on NLE 5626, there would be no output signal at terminals 5622, 5704, 5714, and 5714 of FIGS. 5b, 6a, 6b, and 14a, respectively, and the signal is reflected back into terminals 5712, and 5716 of FIG. 14a, and their corresponding terminals 5614 and 5667, 5702 and 5706, and 5712 and 5716 of FIGS. 5b, 6a, and 6b, respectively. The only situation that terminals 5622, 5704, 5714 and 5714 of FIGS. 5b, 6a, 6b, and 14a, respectively, produce an output signal is the situation where there is a simultaneous overlapping between NLE 5626, large amplitude optical component, and small amplitude component as illustrated by FIG. 14b. FIG. 14b shows an overlapping, on NLE 5626, between small and large amplitude optical components 5858B and 5862A, respectively, corresponding to pulses 5858 and 5862 of FIG. 14a, respectively.

Accordingly, output signal 5866 is produced at terminal 5714 of device 5830 in FIG. 14a. In the specific example of FIGS. 14a and 14b, output pulse 5866 has the same width as pulse 5858 and thus is narrower than input pulse 5832. However, the width of pulse 5866 can be adjusted by the amount of the overlapping, on NLE 5626, between the small and the large amplitude components. The above amount of overlapping between the optical components may be adjusted by the time delay $\Delta T_1$ and the position X(i) of NLE 5626. In any case pulse 5866 is narrower (and may be much narrower) than pulse 5832.

Thus FIG. 14a illustrates a design for optical chopping of pulses incorporating device 5830 that does not consist an attenuator, in its loop 5618, and can operate in both ways, by self and non-self chopping.

2.3.4.1 External All Optical Choppers

Referring to FIGS. 14c and 14d, FIG. 14c illustrates a design for external chopping. In this configuration the additional signal (the high or the low amplitude signal in each pairs of signals) is provided from outside source, such as, optical oscillator or optical pulse generator 5870 instead of using split signal such as signal 5848 of FIG. 14a tapped from input signal 5832. The same referral numerals are used for the same structures and signals in drawings 14a and 14c. Input signals 5832 and 5872 enter radiation guides 5856 and 5874, respectively. In case that signals 5832 and 5872 are with about the same intensity, one of them may be amplified. In this specific example, signal 5872 is amplified by amplifier 5876 but, with no limitation, signal 5832 may be the amplified signal if guide 5856 would include amplifier 5876 as illustrated by broken line. Signal 5872 is amplified, by amplifier 5876, to produce large amplitude input signal 5878 at terminal 5716 of device 5830. Input signal 5832 passes through delay line 5843 and arrives to input 5712 of device 5830 as pulse 5880 with no amplification and with a delay $\Delta T_3$. Pulses 5878 and 5880 merge in loop 5618 (not shown) of device 5830 and produces optical components, such as, components 5864A and 5684B shown in FIG. 14b. As explained in the descriptions for FIGS. 11a and 11b, the non overlapped parts of these components are reflected back from loop 5618 toward terminals 5716 and 5712. The overlapped parts of these components produce signal 5882 at terminal 5714 that is narrower than input signal 5832.

FIG. 14d shows a design similar to the design of FIG. 14c and thus the same referral numerals are used for the same structures and signals in both of the drawings. FIG. 14d differs from FIG. 14c by the terminal used to receive the signal from optical oscillator 5870. In FIG. 14d terminal 5714 receives signal 5878 instead of terminal 5716 used for this purpose in FIG. 14c. Accordingly, the chopped signal 5884 is produced at terminal 5716 corresponding to signal 5882 at terminal 5714 of FIG. 14c.

It should be appreciated that terminals 5716 of devices 5830 of FIGS. 14a and 14c and terminal 5714 of FIG. 14d may also be used to emit chopped signals. The width of the signal acquired from these terminals equals to the width of the non overlapped parts of the optical components in loop 5618.

The width of pulses 5882 and 5884 of FIGS. 14c and 14d can be adjusted by the amount of the overlapping, on NLE 5626, between the small and the large amplitude components. The above amount of overlapping between the optical components may be adjusted by the time delays $\Delta T_1$ and the position X(i) of NLE 5626 on loop 5618. In any case pulses 5882 and 5884 are narrower (and may be much narrower) than input pulse 5832.

Thus FIGS. 14c and 14d illustrate a design for optical chopping of pulses incorporating device 5830 that does not consist an attenuator, in its loop 5618, and can operate as optical chopper using external optical oscillator.

Since input signals 5832 and 5872 are received at terminals 5712 and 5716 of FIG. 14c or terminals 5712 and 5714 of FIG. 14d, are generated by different sources, synchronization unit 5890 may be used to synchronize between signals 5832 and 5872. Some small part 5831 of the incoming signal 5832 is tapped by coupler 5892 and is fed to synchronization unit 5890 through guide 5894 that in turn produces a synchronization signal transferred to by lead 5896 to optical oscillator 5870 to control and synchronize its timing.

Figure 14E:
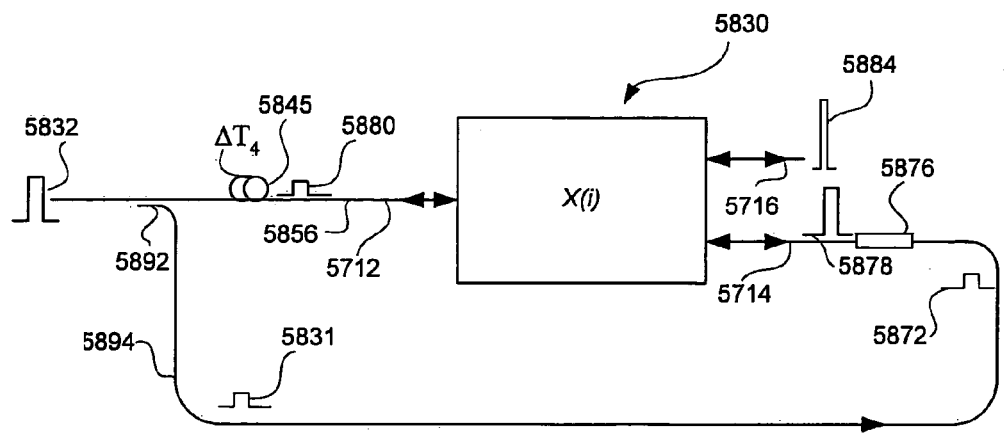

To eliminate the need for synchronization, part of the input signal may be fed to terminal 5714 as illustrated by FIG. 14e. FIG. 14e illustrates a chopping system similar to the chopper shown in FIG. 14d with the exception that the tapped signal 5831 is fed directly, as signal 5872, into optical amplifier 5876 and from there to terminal 5714 instead of being fed to synchronization unit 5890 of FIG. 14d. The use of input signals 5880 and 5878 in terminals 5712 and 5714, respectively, is analog to the use shown in FIG. 14d. Accordingly, the way of operation of the chopper of FIG. 14e is similar to the way of operation of the chopper of FIG. 14d which is explained above and thus the explanation will not be repeated here. In the chopper of FIG. 14e the input signals 5880 and 5878 at terminals 5712 and 5714 are produced by the same pulse source and thus there is no need to synchronize between them. The timing between signals 5832 and 5878 is done once by initial adjustment of delay line 5845 to produce the desired delay $\Delta T_4$.

It should be appreciated that the choppers illustrated by FIGS. 14a–14d using devices 5830 of the type 5700 of FIG. 6a schematically illustrated by block diagram 5710 of FIG. 6b may use devices 5720 of FIG. 7a schematically illustrated by block diagram 5730 of FIG. 7b as well. When devices 5830 are of the type 5700, the input signal should include pairs of pulses that each pulse in each pair of pulses has different amplitude. The pair of pulses may be fed to a single input, such as input 5712 shown in FIG. 14a or each pulse of the pair of pulses may be fed into a different input, such as inputs 5712 and 5716 as illustrated by FIG. 14c or inputs 5712 and 5714 of FIGS. 14d and 14e.

Devices 5830 of the type 5720 represented by device 5730 include attenuators in their loop and thus the input signals in their inputs may include pairs of pulses that both of the pulses in each pair may have the same amplitude. The pair of pulses, having the same or similar amplitudes, may be fed to a single input, such as shown in FIG. 14a or each pulse of the pair of pulses may be fed into different input as illustrated by FIGS. 14c–14e.

To convert the choppers illustrated by FIGS. 14a–14e from operating with devices 5830 that represent devices 5700 (or 5710) to devices 5830 that represent devices 5720 (or 5730), all that is needed is to adjust the pulses of the input signals to be equal or similar. The pulses of the input signals are adjusted to be equal or similar by setting the splitting ratio of couplers 5854 of FIG. 14a and 5892 of FIG. 14e, adjusting the amplifications of optical amplifiers 5840 of FIG. 14a and 5876 of FIGS. 14c, 14d and 14e, and/or setting the optical oscillators 5870 of FIGS. 14c and 14d to produce their signals in the desired amplitudes.

Accordingly, it is clear that the choppers of FIGS. 14a–14e include devices 5830 that may represent either devices 5710 of FIG. 6b or devices 5730 of FIG. 7b.

2.3.4.2 Head and Tail Chopping Performed by a Single All Optical Chopper

Figure 15A:
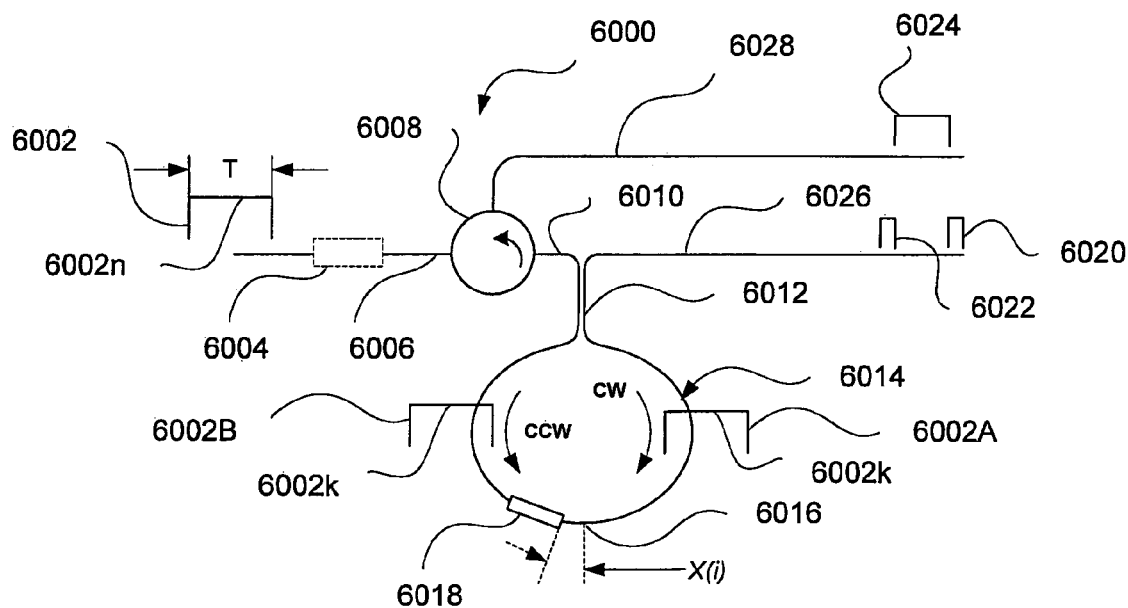
FIG. 15a illustrates an all optical chopper in accordance with another aspect of the invention designed for head and tail self chopping.

FIG. 15a illustrates chopping device 6000 designed for both, head and tail chopping. Device 6000 is similar to devices 5700 of FIG. 6a with several changes:

1. The position of non linear element 6018 of device 6000 of FIG. 15a is displaced from center 6016 by amount X(i) that is smaller than the spatial width W of pulse 6002 having a time width of T.
2. Optical amplifier 6004 may be included in input 6006 of device 6000.
3. Circulator 6008 is used in device 6000 to replace coupler 5665 in device 5700 of FIG. 6a.

Input 6006 that may include optical amplifier 6004 receives input pulse 6002 having a time width T and amplitude 6002n and directs pulse 6002 into circulator 6008. Circulator 6008 transmits pulse 6002 into terminal 6010 of directional coupler 6012. Directional coupler 6012 receives pulse 6002 from terminal 6010 and splits pulse 6002 into two optical components 6002A and 6002B having equal amplitudes 6002k and propagating clockwise and counterclockwise, respectively, in optical loop 6014. Loop 6014 includes non linear element 6018 displaced from center 6016 of loop 6014 by a distance X(i) that is smaller than the spatial width W of pulse 6002. The spatial width of pulse 6002 is given by $W = C \cdot T/n$ where C is the speed of light in vacuum, T is the time width of pulse 6002, and n is the refractive index of the material in which pulse 6002 propagates in.

Optical components 6002A and 6002B propagate through non linear element 6018 and experience phase shifts that are proportional to the intensities of their amplitudes. Since the displacement X(i) is smaller than the spatial width W of pulse 6002 and components 6002A and 6002B, optical components 6002A and 6002B partially overlap each other at non linear element 6018. This means that the parts of optical components 6002A and 6002B that do not overlap each other at non linear element 6018 propagate through non linear element 6018 with small amplitude 6002k while experiencing a phase shift that is proportional to the intensity of their amplitude. However, the parts of optical components 6002A and 6002B that do overlap each other at non linear element 6018 propagate through non linear element 6018 while experiencing a phase shift that is proportional to the sum 6002j of the intensities of their amplitude (see FIGS. 15c–15e). The propagation sequence of optical components 6002A and 6002B in the vicinity of center 6016 of loop 6014 that includes non linear element 6018 is illustrated step by step in FIGS. 15b–15e.

FIGS. 15b–15e illustrate the clockwise and counterclockwise propagation of optical components 6002A and 6002B along part of loop 6014, respectively. The part of loop 6014 illustrated by FIGS. 15b–15e is shown schematically, without any limitations, as a strait optical path including center 6016 and non linear element 6018.

Figure 15B:
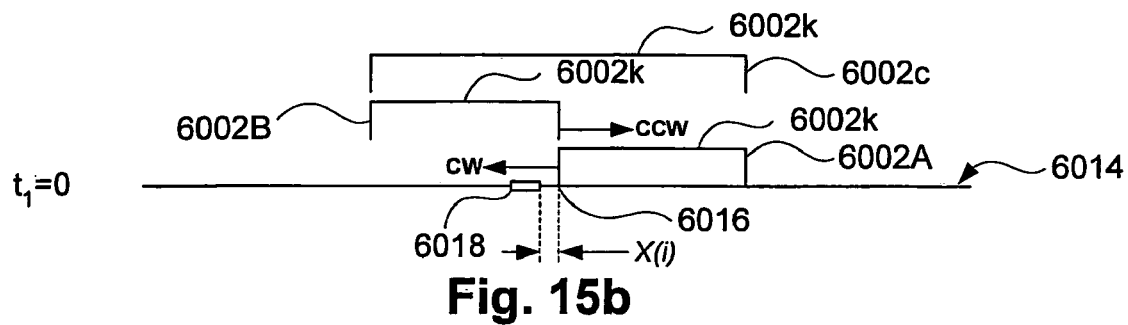

FIG. 15b shows the situation where the head part of optical components 6002A and 6002B first meet at center 6016 of loop 6014. The timing of the situation illustrated by FIG. 15b can be chosen arbitrarily to be $t_1=0$. Pulse 6002c is a schematic illustration representing the sum of the intensities of optical components 6002A and 6002B.

Figure 15C:
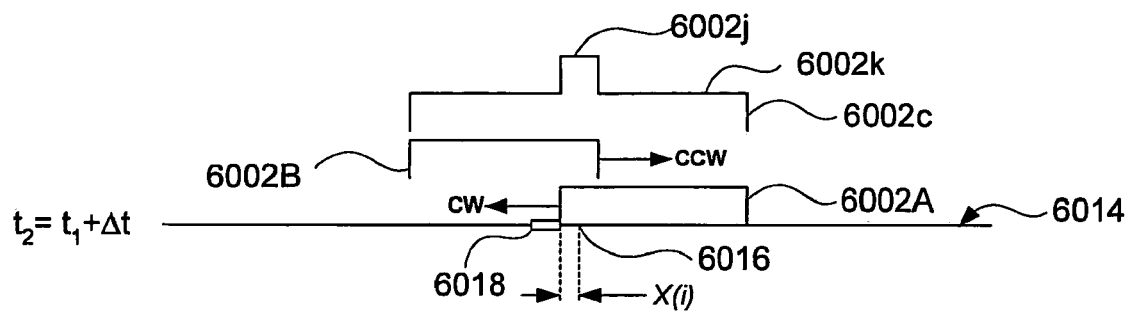
Figure 15D:
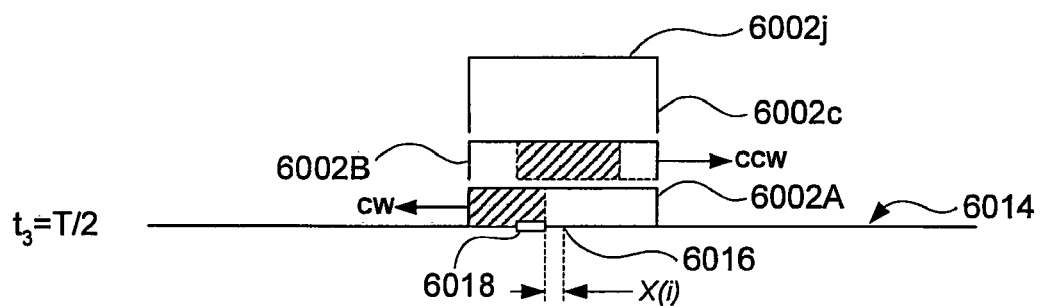
Figure 15E:
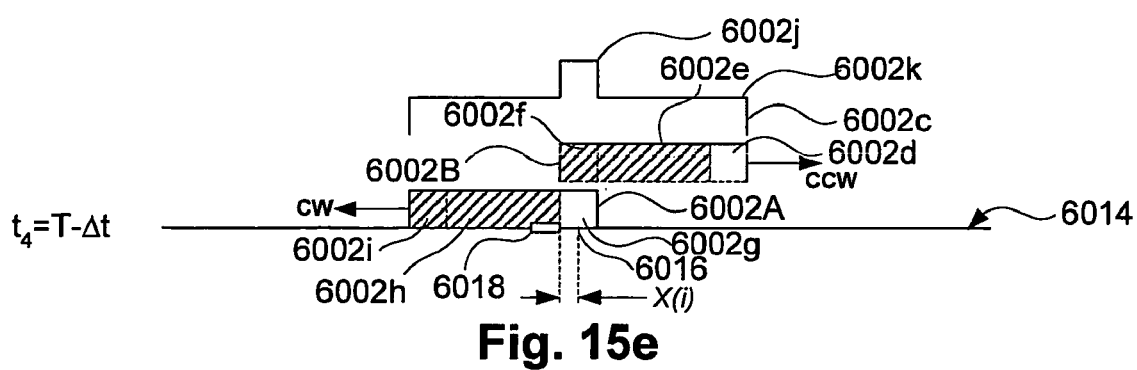

FIG. 15c illustrates the situation in which clockwise optical component 6002A reaches the entrance of non linear element 6018 at time $t_2=\Delta t+t_1$, thus t2 occurs at $\Delta t$ after time $t_1$. Given the arbitrarily chosen $t_1=0$, $t_2$ occurs at $t_2=\Delta t$. $\Delta t$ is given by $\Delta t\ X(i) \cdot n/C$, where C is the speed of light in vacuum, X(i) is the displacement of non linear element 6018 from center point 6016 of loop 6014, and n is the refractive index of the material in which pulses 6002A and 6002B propagate in. In this situation, pulse 6002c has higher level 6002j produced by summing of the intensities of optical components 6002A and 6002B having amplitude 6002k each. It should be understood that the summing of the amplitudes of components 6002A and 6002B in the situation illustrated by FIG. 15c occurs outside of non linear element (NLE) 6018 and thus the phase shift that NLE 6018 produces is proportional only to the intensity 6002k of an individual optical component 6002B. However, FIG. 15c illustrates a situation in which the summing of the amplitudes of optical components 6002A and 6002B is going to start when they enter NLE 6018. This means that from the $t_2$ point in time, as illustrated by FIG. 15c, the higher intensity 6002j of pulse 6002c is formed inside NLE 6018, a situation that happens until time $t_4$, in which optical components 6002A and 6002B do not overlap no longer at NLE 6018, as illustrated by FIG. 15e FIG. 15d illustrates the situation in which clockwise optical components 6002A and 6002B completely overlap each other at time $t_3=T/2$ which occurs at time $(T-2\Delta t)/2$ later than time $t_2=\Delta t$. In this point in time pulse 6002c has only higher level 6002j produced by summing of the intensities of optical components 6002A and 6002B having amplitude 6002k each. It should be understood that the summing of the amplitudes of components 6002A and 6002B in the situation illustrated by FIG. 15d occurs also inside NLE 6018 and thus the phase shift that NLE 6018 produces is proportional to the sum 6002$j$ of intensities 6002$k$ of the individual optical components 6002A and 6002B. The parts of optical components 6002A and 6002B that experience a phase shift, by NLE 6018, that is proportional to the intensity of higher level 6002$j$ of pulse 6002$c$ are indicated by hatched lines regions. The higher level 6002$j$ of pulse 6002$c$ exists in NLE 6018 till the situation illustrated by FIG. 15$e$ at time $t_4$.

FIG. 15$e$ illustrates the situation in which counterclockwise optical components 6002B exits out of NLE 6018 at time $t_4$=T–$\Delta$t which is at time T/2–$\Delta$t later than time $t_3$=T/2. From this situation and on, pulse 6002$c$ has higher level 6002$j$ that is outside NLE 6018 or may even have no higher level 6002$j$ at all at a later time. Since the summing of the amplitudes of components 6002A and 6002B for the time that follows the situation illustrated by FIG. 15$e$ occurs outside NLE 6018 the phase shift that NLE 6018 produces is proportional to the intensity 6002$k$ of individual optical component 6002A.

Accordingly, FIG. 15$e$ illustrates the final phase shifts that components 6002A and 6002B experience while propagating through NLE 6018 on their way back to coupler 6012. The regions marked with hatched background are parts 6002$h$, 6002$i$ of optical component 6002A and respective parts 6002$e$ and 6002$f$ of optical component 6002B. The hatched regions indicate parts of the components that experience large phase shift produced by NLE 6018 when higher level 6002$j$ exists in NLE 6018. The situation where higher level 6002$j$ exists in NLE 6018 starts with the situation illustrated by FIG. 15$c$ at time $t_2$ and ends with the situation illustrated by FIG. 15$e$ at time $t_4$. The regions with clear background are parts 6002$g$ and 6002$d$ of optical components 6002A and 6002B, respectively. Clear regions 6002$g$ and 6002$d$ indicate the parts of optical components 6002A and 6002B that experience, by NLE 6018, a phase shift that is proportional to the intensity of individual optical component 6002A or 6002B having an intensity level 6002$k$ of pulse 6002$c$.

Under optimal conditions the higher level 6002$j$ of pulse 6002$c$ is adjusted to have a phase shift that is larger by $\pi$ radians than the phase of amplitude 6002$k$. In this case the clear parts and the hatched parts of optical components 6002A and 6002B are in anti-phase. Accordingly, clear part 6002$d$ that is the head of optical component 6002B is recombined, at coupler 6012 of FIG. 15$a$, in anti-phase with hatched part 6002$i$ that is the head of optical component 6002A to produce optical pulse 6020 at terminal 6026 of device 6000 of FIG. 15$a$.

The mid hatched parts 6002$h$ and 6002$e$ of optical respective components 6002A and 6002B are combined with the same phase, by coupler 6012 of FIG. 15$a$, to form a pulse at terminal 6010 which is transmitted from there, by circulator 6008, to terminal 6028 of device 6000 of FIG. 15$a$ as pulse 6024.

Hatched part 6002$f$ that is the tail of optical component 6002B is recombined, at coupler 6012 of FIG. 15$a$, in anti-phase with clear part 6002$g$ that is the tail of optical component 6002A to produce optical pulse 6022 at terminal 6026 of device 6000 of FIG. 15$a$.

It can be seen that the head and tail chopping, performed by device 6000 of FIG. 15$a$, appear as pulses 6020 and 6022 at port 6026, respectively. The middle chopping, performed by device 6000 of FIG. 15$a$, appears as pulse 6024 at port 6028. From the propagation sequence illustrated by FIGS. 15$b$–15$e$, it can be seen that regions 6002$d$ and 6002$i$ and 6002$f$ and 6002$g$ of optical components 6002A and 6002B are all having a time width of 2$\Delta$t or a spatial width of 2X(i). This means that the head and tail chopped pulses 6020 and 6022 of FIG. 15$a$ that are formed by the above regions in optical components 6002A and 6002B also have time width of 2$\Delta$t or a spatial width of 2X(i). The mid chopped pulse 6024 is the complementary part of pulses 6020 and 6022. Thus the sum of the spatial width of pulses 6020, 6022, and 6024 should be equal to the spatial width W of input pulse 6002. Accordingly, pulse 6024 has a time width of T–4$\Delta$t and a spatial width of W–4X(i).

For example, when NLE 6018 is a solid state (Semiconductor) Optical Amplifier (SOA), the relative phase shift between the phases that NLE 6018 produces for intensity level (amplitude) 6002$j$ and 6002$k$ may be adjusted to be $\pi$ radians by adjusting the current bias injected to the SOA and or by adjusting the intensity of input pulse 6002 by selecting the proper gain of amplifier 6004 that may be included in input 6006.

The use of circulator 6008 instead of a coupler has the advantage of reduced loss since circulator 6008, unlike a directional coupler, transmits most of the energy of pulse 6002 from input 6006 to terminal 6010 and transmits most of the energy of a pulse reflected back from loop 6014 via terminal 6010 to port 6028.

It should be understood that circulators such as circulator 6008 of FIG. 15$a$ may be used to replace directional couplers 5665 and 5664 in devices 5700 and 5720 illustrated by FIGS. 6$a$ and 7$a$, respectively.

Figure 16:
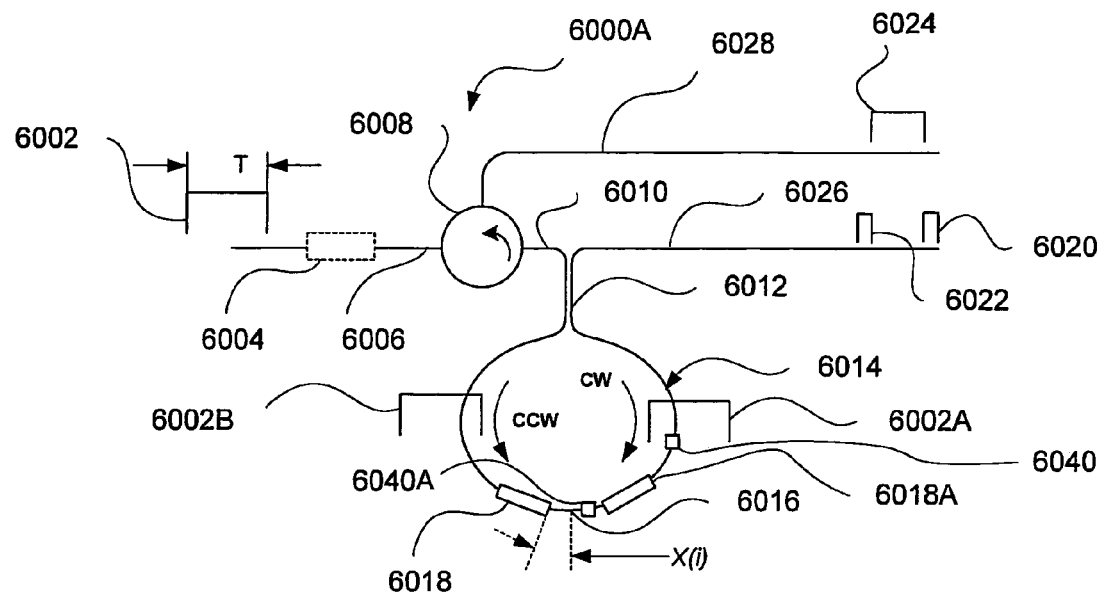
FIG. 16 illustrates an all optical chopper in accordance with an alternative aspect of the invention designed for head and tail self chopping.

Another version of double chopping device that performs head and tail chopping is illustrated by FIG. 16. FIG. 16 is similar to FIG. 15$a$ and thus the same referral numbers are used for the same parts in FIGS. 15$a$ and 16.

The following components were added to FIG. 15$a$ to create device 6000A of FIG. 16:

1. NLE 6018A was added into optical loop 6014.
2. Attenuators 6040 and 6040A were added into optical loop 6014.

NLE 6018A may be displaced to the right of center 6016 of loop 6014 by the same distance X(i) in which NLE 6018 is displaced to the left from center 6016. Attenuators 6040 and 6040A are distributed along loop 6014 and having the proper attenuation to assure that both, NLE's 6018 and 6018A receive the clockwise (CW) optical component with smaller amplitude than they receive the counterclockwise (CCW) optical component. In a situation that NLE's 6018 and 6018A produces a phase shift for the large CCW optical component-that is greater by $\pi$ radians from the phase shift that they produce for the small amplitude CW optical component, then as explained above in the descriptions for FIGS. 9$a$–9$d$ and 11$a$–11$b$ the pair of NLE 6018 and attenuator 6040A produce head chopping and as explained above in the descriptions for FIGS. 10$a$–10$c$ and 12$a$–12$b$ the pair of NLE 6018A and attenuator 6040 produce tail chopping.

Accordingly, device 6000A produces head and tail chopping and emits the chopped head and tail as pulses 6020 and 6022 at terminal 6026. The mid part of input pulse 6002 after the head and tail chopping appears as pulse 6024 at port 6028. In the example where the time width of input pulse 6002 is T corresponding to a spatial width W and where both NLE's 6018 and 6018A are displaced to the left and to the right by the same distance X(i), respectively, then:

1. The time width of pulses 6020 and 6022 at port 6026 of device 6000A of FIG. 16 is 2$\Delta$t and their spatial width is 2X(i).

2. The time width of pulse 6024 at port 6028 of device 6000A of FIG. 16 is T−4Δt and its spatial width is W−4X(i).

2.3.4.3 All Optical Choppers with Switched Output Signals

Figure 17:
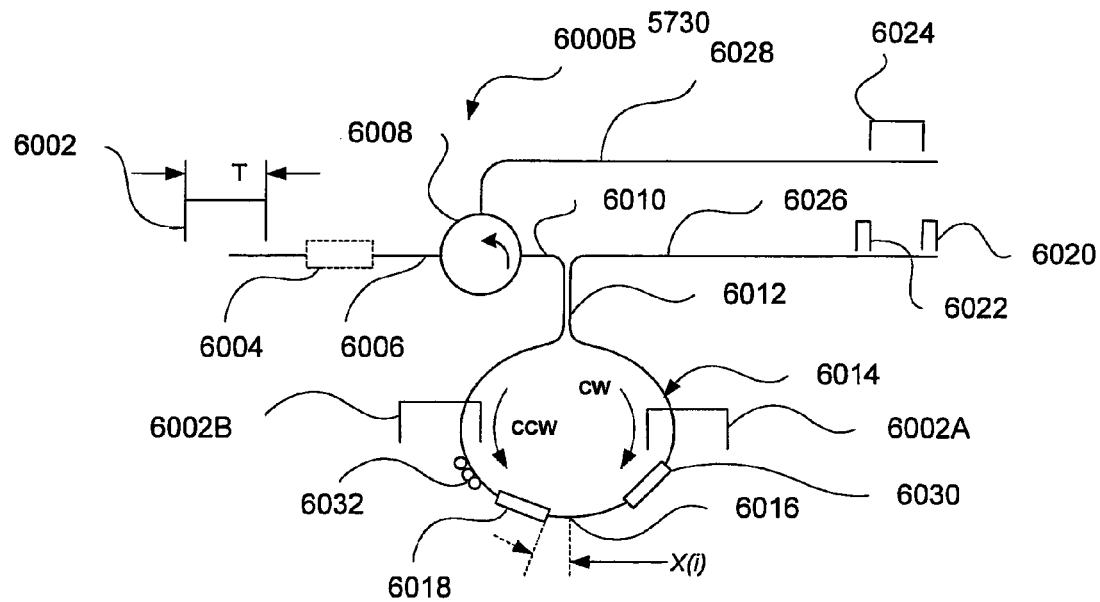
FIG. 17 illustrates an all optical chopper with the capability to switch the signals between its output ports.

In some situations there is a need to switch the signals between the outputs of the device. For example, if there is a need to monitor or use only signal 6024 at port 6028 of device 6000 of FIG. 15*a*, this signal may be directed to port 6026. Directing signal 6024 to port 6026 may save the use of circulator 6008. FIG. 17 shows how to switch the signal from being emitted at one output to be emitted at the other output.

FIG. 17 illustrates a device similar to device 6000 of FIG. 15*a* and thus the same referral numerals are used in FIGS. 15*a* and 17 to illustrate the same parts. The followings were added to FIG. 15*a* to produce device 6000B of FIG. 17.

1. NLE 6030 was added to optical loop 6014
2. Polarization controller 6032 was added to optical loop 6014

The use of either NLE 6030 or Polarization controller (PC) 6032 or both of them may create birefringence segments in the loop. This birefringence may rotate the polarization of clockwise optical component (CW) 6002A by an angle that is different from the rotation angle that the birefringence segment produces for counterclockwise optical component (CCW) 6002B. The difference between the rotational angles of the CW optical component 6002A and CCW optical component 6002B may be adjusted, by PC 6032 or the injection current into NLE 6030 (SOA), to be π radians. As explained above, pulses 6020 and 6022 and pulse 6024 are emitted from ports 6026 and 6028 of device 6000 of FIG. 15*a*, respectively, as the optical components 6002A and 6002B return to coupler 6012 with the same polarization. However, in this case, pulses 6020 and 6022 and pulse 6024 are emitted from ports 6028 and 6026 of device 6000B of FIG. 17, respectively, since in device 6000B optical components 6002A and 6002B return to coupler 6012 with polarizations oriented in directions opposite to each other.

It should be clear that switching the signals between the output ports using additional SOA and or PC may be used as well in devices 5700 and 5720 of FIGS. 6*a* and 7*a*, respectively.

2.3.4.4 All Optical Choppers with Selectable Chopping

Figure 18:
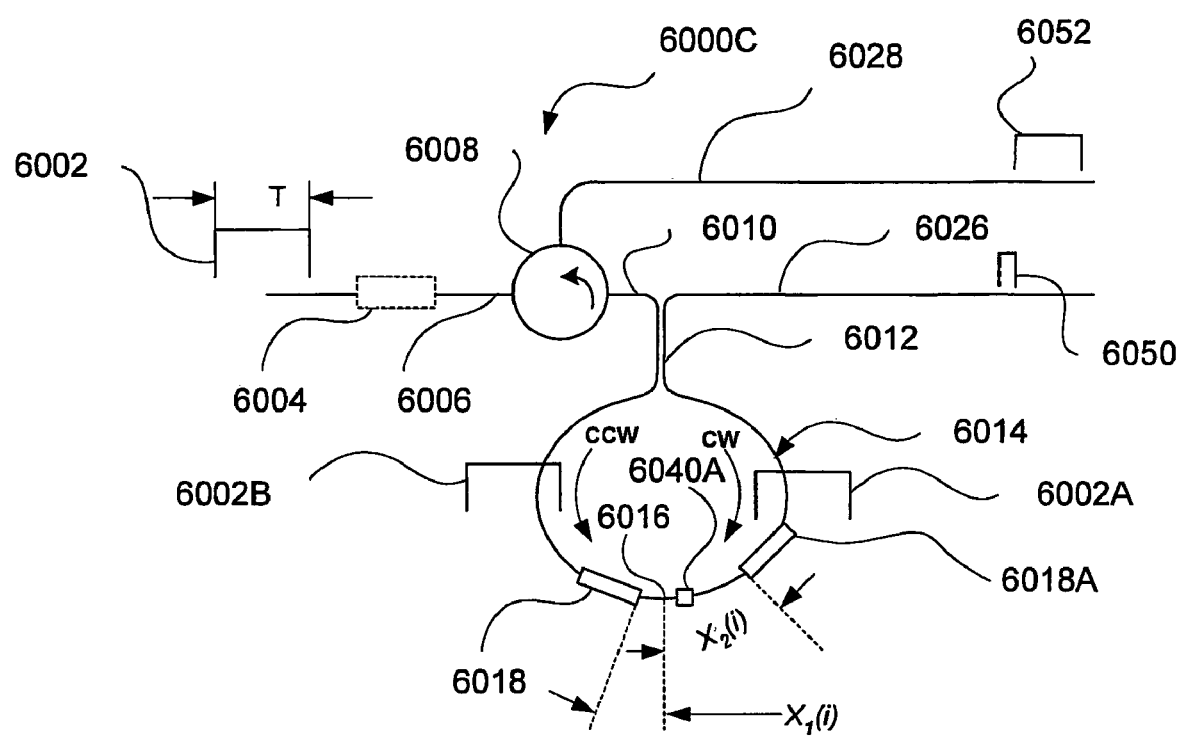
FIG. 18 illustrates an all optical chopper with selectable amounts of chopping.

Selecting the amount of chopping may be achieved by selecting the position X(i) of the NILE at the optical loop. Adjusting or selecting of the position X(i) of NLE in the optical loop may be done by using a variable delay line in the optical loop, such as, in the case when block units 6040 and 6040A of FIG. 16 and block unit 6040A of FIG. 18 may include attenuators and variable optical delay lines as well. The use of variable optical delays is beneficial when the optical chopper is constructed of optical fibers, as it easily permits dislocation of NLE by the displacement X(i). In this case the displacement X(i) of the NLE from the center of the loop varies with the amount of delays produced by both, optical delay lines in block units 6040 and 6040A or by either one of them. However when the optical chopper is fabricated on a chip, the position X(i) of the is fixed and may not be varied. FIG. 18 illustrates an embodiment for optical chopping that may provide selectable chopping even when the device is fabricated on a chip.

FIG. 18 illustrates a device similar to device 6000A of FIG. 16 thus the same referral numerals are used in FIGS. 16 and 18 to illustrate the same parts. The followings changes have been done to device 6000A of FIG. 16 in order to produce device 6000C of FIG. 18.

1. Attenuator 6040 has been removed from optical loop 6014 of device 6000A of FIG. 16.
2. NLE 6018 has been displaced to the left of center 6016 of loop 6014 of device 6000A of FIG. 16 by a distance equal to $X_1(i)$.
3. NLE 6018A has been displaced to the right of center 6016 of loop 6014 of device 6000A of FIG. 16 by a distance equal to $X_2(i)$ where $X_2(i) \neq X_1(i)$.

As exists in devices 6000, 6000A, and 6000B of FIGS. 15*a*, 16, and 17, respectively, the spatial width W of input signal 6002 is larger than the displacements of the NLE's and thus $W > X_1(i)$ and $W > X_2(i)$.

Device 6000C of FIG. 18 is an all-optical chopper having the capability to produce selectable amounts of chopping. The attenuation A of Variable Optical Attenuator (VOA) 6040A is adjustable. The gains $G_1$ and $G_2$ of NLE's 6018 and 6018A, respectively, may be adjusted as well by the current injected to NLE's 6018 and 6018A. As illustrated by FIG. 1*b*, VOA 6040A may be an SOA operated in its absorption range and is activated by a low level and adjusted by a variable injection current. In such a case and without any limitations, when NLE's 6018 and 6018A may be SOA's as well, loop 6014 may contain three SOA's.

As discussed above in the descriptions for choppers 5720 and 5730 of FIGS. 7*a* and 7*b*, respectively, the chopping is produced due to the different phase shifts that the different amplitudes of the CW and CCW optical components experience in the NLE. This means that any NLE in optical loop 6014 that receives CW and CCW optical components having equal intensity, operates in a symmetric way and does not contribute to the chopping process.

Accordingly, in a situation where gain $G_1$ of NLE 6018 is adjusted to be equal to gain $G_2$ that is equal to 1/A, where A is the attenuation of VOA 6040, then NLE 6018 receives CCW optical component 6002B with its initial intensity $I_0$ in which component 6002B enters loop 6014. CW optical component 6002A enters to loop 6014 with the same intensity $I_0$ as CCW 6002B and arrives to NLE 6018 after being amplified by gain $G_2 = G_1$ of NLE 6018A and attenuated by attenuation A of attenuator 6040A. Accordingly, CW optical component 6002A arrives to NLE 6018 with intensity $I_0 \cdot G_2 \cdot A = I_0 \cdot (1/A) \cdot A = I_0$. This means that NLE 6018 receives CW and CCW optical components 6002A and 6002B, respectively, with equal intensity $I_0$ and thus do not contribute to the chopping process.

Similarly, NLE 6018A receives CW optical component 6002A with its initial intensity $I_0$ in which component 6002A enters loop 6014. CCW optical component 6002B enters to loop 6014 with the same intensity $I_0$ as CW 6002A and arrives to NLE 6018A after being amplified by gain $G_1 = G_2$ of NLE 6018 and attenuated by attenuation A of attenuator 6040A. Accordingly, CCW optical component 6002B arrives to NLE 6018A with intensity $I_0 \cdot G_1 \cdot A = I_0 \cdot (1/A) \cdot A = I_0$. This means that NLE 6018A receives CW and CCW optical components 6002A and 6002B, respectively, with equal intensity $I_0$ and thus do not contribute to the chopping process.

Accordingly, in this case, none of NLE's 6018 and 6018A contribute to the chopping process and device 6000C of FIG. 18 does not perform any chopping and behaves similar to a symmetric optical loop mirror. In this situation the whole energy of optical components 6002A and 6002B is reflected back from loop 6014 to terminal 6010 and directed from there, by circulator 6008, into port 6028 to form there pulse 6052. Pulse 6052 at port 6028 has a spatial width W equal to the width of input signal 6002 and no signal appears at port 6026. We refer to this situation as chopping by an amount of zero.

In another setting for producing a certain chopping that is different from zero, device 6000C may be adjusted to perform a chopping only by NLE 6018. In this situation the currents injected into NLE's 6018 and 6018A are adjusted to produce gains $G_1$ and $G_2$ in NLE's 6018 and 6018A, respectively, where $G_1 \neq G_2$ and $G_1 > G_2$. Gain $G_1$ of NLE 6018 and attenuation A of attenuator 6040A are adjusted to fulfill the mathematical condition $G_1 \cdot A = 1$. In such a case CW optical component 6002A enters NLE 6018A with intensity $I_0$ and CCW optical component 6002B enters NLE 6018A with intensity $I_0 \cdot G_1 \cdot A = I_0$ as well. Thus NLE 6018A receives on one side CW optical component 6002A and on the other side it receives CCW optical component 6002B where both of the optical components have the same intensity $I_0$. This means that NLE 6018A does not contribute to the chopping process of device 6000C.

At the same time, NLE 6018 receives the CCW optical component 6002B with intensity $I_0$ and receives the CW optical component 6002A with intensity that is equal to $I_0 \cdot G_2 \cdot A < I_0$. Accordingly, NLE 6018 receives CCW optical component 6002B with intensity that is greater than the intensity in which NLE 6018 receives CW optical component 6002A. The difference between the small intensity of the CW optical component 6002A and the large intensity of the CCW optical components 6002B may be adjusted, by adjusting gains $G_1$ and $G_2$ of NLE's 6018 and 6018A, respectively, and attenuation A of VOA 6040A, to produce a relative phase shift of $\pi$ radians between the phase shifts that CCW and CW optical components 6002B and 6002A experience while propagating in NLE 6018. In this case NLE 6018 contributes to the chopping process while NLE 6018A does not contribute to the chopping process. The situation where the small amplitude propagate clockwise and the large amplitude propagates counterclockwise while the NLE that perform the chopping is displaced to the left of center 6016 of loop 6014 is equivalent to the situation of devices 5720 and 5730 of FIGS. 7a and 7b. The propagation sequence of optical components 6002A and 6002B is equivalent to the propagation of optical components 5570 and 5572 illustrated by FIGS. 9a–9d. Accordingly, pulses 6052 and 6050 formed at respective ports 6028 and 6026 of device 6000C of FIG. 18 are equivalent to pulses 5804 and 5806 formed at ports 5808 and 5810 of FIG. 11a, respectively. Accordingly, the descriptions and explanations for FIGS. 7a, 7b, 9a–9d, and 11a holds as well for device 6000C in the situation where only NLE 6018 contribute to the chopping and these descriptions and explanations will not be repeated here.

From FIG. 11a and its analogy to Device 6000C of FIG. 18, one can see that pulse 6052 at port 6028 of device 6000C is chopped in time by an amount of $2\Delta t_1$ which is equivalent to a spatial chopping by an amount $2X_1(i)$. Thus when the initial spatial width of input pulse 6002 is W the spatial width of pulse 6052 at port 6028 is $W - 2X_1(i)$.

Similarly, pulse 6050 at port 6026 will have a time width of $2\Delta t_1$ corresponding to a spatial width of $2X_1(i)$. Under this setting of chopping, device 6002C produces a head chopping.

In an alternative setting for producing a certain chopping that is different from zero and different from time width $2\Delta t$ (or spatial width $2X_1(i)$), device 6000C may be adjusted to perform a chopping only by NLE 6018A. In this situation the currents injected to NLE's 6018 and 6018A are adjusted to produce gains $G_1$ and $G_2$ in NLE's 6018 and 6018A, respectively, where $G_1 \neq G_2$ and $G_2 > G_1$. Gain $G_1$ of NLE 6018 and attenuation A of VOA 6040A are adjusted to fulfill the mathematical condition $G_2 \cdot A = 1$. In such a case, CCW optical component 6002B enters NLE 6018 with intensity $I_0$ and CW optical component 6002A enters NLE 6018 with intensity $I_0 \cdot G_2 \cdot A = I_0$ as well. Thus NLE 6018 receives on one side CW optical component 6002A and on the other side it receives CCW optical component 6002B where both of the optical components have the same intensity $I_0$. This means that NLE 6018 does not contribute to the chopping process of device 6000C.

At the same time, NLE 6018A receives CW optical component 6002A with intensity $I_0$ and receives the CCW optical component 6002A with intensity that is equal to $I_0 \cdot G_1 \cdot A < I_0$. 0Accordingly, NLE 6018A receives CW optical component 6002A with intensity that is greater than the intensity in which NLE 6018A receives CCW optical component 6002B. The difference between the small intensity of the CCW optical component 6002B and the large intensity of the CW optical components 6002A may be adjusted, by adjusting gains $G_1$ and $G_2$ of NLE's 6018 and 6018A, respectively, and attenuation A of VOA 6040A, to produce a relative phase shift of $\pi$ radians between the phase shifts that CCW and CW optical components 6002B and 6002A experience while propagating in NLE 6018A. In this case NLE 6018A contributes to the chopping process while NLE 6018 does not contribute to the chopping process. The situation where the small amplitude propagates counterclockwise and the large amplitude propagates clockwise while the NLE that perform the chopping is displaced to the right of center 6016 of loop 6014 is also equivalent to the situation of devices 5720 and 5730 of FIGS. 7a and 7b. It should be understood that in spite of the fact that, in this situation, the only NLE that contributes to the chopping is NLE 6018A that is displaced to the right of center 6016 of loop 6014, device 6000C still behaves like devices 5720 and 5730 of FIGS. 7a and 7b in which the NLE that performs the chopping is displaced to the left of the center of the loop. This behavior is due to the fact that symmetry in the analysis is maintained—not just the position of the NLE switched from left to right but, also the directions of the large and small amplitudes of the CW and CCW optical components in the loop have been switched in their directions as well. Accordingly, in this situation, device 6000C produces head chopping as well and the propagation sequence of optical components 6002A and 6002B of FIG. 18 is equivalent to the propagation of optical components 5570 and 5572 illustrated by FIGS. 9a–9d. Accordingly, pulses 6052 and 6050 formed at ports 6028 and 6026 of device 6000C of FIG. 18 are equivalent to pulses 5804 and 5806 formed at ports 5808 and 5810 of FIG. 11a, respectively. Accordingly, the descriptions and explanations for FIGS. 7a, 7b, 9a–9d, and 11a holds as well for device 6000C in the situation where only NLE 6018A contribute to the chopping and these descriptions and explanations will not be repeated here.

From FIG. 11a and its analogy to Device 6000C of FIG. 18, one can see that pulse 6052 at port 6028 of device 6000C is chopped in time by an amount of $2\Delta t_2$ which is equivalent to spatial chopping by an amount $2X_2(i)$. Thus when the initial spatial width of input pulse 6002 is W the width of pulse 6052 at port 6028 is $W - 2X_2(i)$.

Similarly, pulse 6050 at port 6026 will have a time width of $2\Delta t_2$ corresponding to a spatial width of $2X_2(i)$.

From the discussion above it can be seen that device 6000C can be operated in any mode selected from the three possible modes of operation to perform chopping by an spatial amount of 0, $2X_1(i)$ or $2X_2(i)$.

Device 6000C may produce tail chopping when one of NLE's 6018 and 6018A does not contribute to the chopping process since it operates symmetrically when it receives the CW and the CCW optical components 6002A and 6002B with equal intensities and the other NLE receives the larger optical component propagating from the center 6016 of loop 6014. This situation is equivalent and analog to the situation illustrated by FIGS. 10a–10c and FIG. 12a showing the process of tail chopping.

Following the explanations and the descriptions above for FIG. 18 it becomes clear that selectable tail chopping may be produced by device 6000C as well under the following conditions:

1. Tail chopping by an amount of time $2\Delta t_1$ corresponding to spatial chopping by an amount of $2X_1(i)$ requires:

$G_1 \neq G_2 G_2 > G_1$, and $G_1 \cdot A = 1$.

In this case NLE 6018 is the one that contributes to the chopping and NLE 6018A does not.

2. Tail chopping by an amount of time $2\Delta t_2$ corresponding to spatial chopping by an amount of $2X_2(i)$ requires:

$G_1 \neq G_2$ $G_1 > G_2$, and $G_2 \cdot A = 1$.

In this case NLE 6018A is the one that contributes to the chopping and NLE 6018 does not.

2.3.4.5 Chopping Using Rotation of Polarization

It should be understood that some of the embodiments in the present invention are illustrated and described in a situation when the polarization orientation of the optical components in the optical loop is preserved. This situation may occur when the NLE in the loop does not produce polarization rotation and the light guides of the optical loop have no birefringence or when the loop may include a polarization controller.

However, it should be understood that these embodiments while are illustrated and described with reference to relative phase shifts between the phases of the optical component in their optical loop, their operational principle may be related as well to relative rotational angles between the polarization angles of the optical components in the optical loops. This situation may exist when the NLE in the optical loop is polarization sensitive and may produce a polarization rotation by an amount that is related to the intensity or amplitude of the optical components in the optical loop. In such a situation, it means that for these embodiments the relative phase shifts and the relative rotational angles of the polarizations of the optical components in the optical loops may be analyzed and understood as relative angles (phase angles and or polarization angles) that may affect the operation of the embodiments in the same manner that explained above for the relative phase shifts.

Accordingly, it should be understood that the descriptions, explanations, and illustrations above related to relative phase shifts between the optical components in optical the loops may be suitable to represent, in a similar manner, the relative rotational shifts of the polarizations between the optical components in optical the loops as well or even may represent any combination between the two, the relative phase shifts and the relative rotational shifts of the polarizations.

Any or all the embodiments of the present, as described in detail above, may include a continuous sequence of optical components connected by light guiding media such as, for example, optical fibers, planar waveguides, or planar circuits (PLC), which media may be fabricated using integrated optic techniques and/or on-chip manufacturing. Alternatively, any or all of the embodiments described above may be constructed from discrete components, in which case the optical guiding media may be replaced by open space, e.g., vacuum, or by a non-solid, e.g., gaseous media, and the directional couplers may be replaced with beam splitters or circulators. It should be understood that all amplifiers and attenuators may include variable and/or adjustable components. It should be clear that all amplifiers may be prepared of amplifying media and devices and in particular are made of SOA's, LOA's and EDFA's. It should be appreciated that all attenuators may be prepared of attenuating media and devices and in particular are made of couplers and absorbing amplifiers.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. An all optical chopping device for shaping and reshaping comprising:
   i. a first splitting device having at least first, second, and third terminals; and
   ii. at least one nonlinear element,
   wherein said second and third terminals form an optical loop including said at least one nonlinear element displaced from the center of said optical loop,
   wherein said first splitting device is arranged to receive an input signal from the first terminal for reflecting a first output signal into the first terminal, and
   wherein said first output signal is narrower than said input signal.

2. The device of claim 1 wherein said first splitting device further includes a fourth terminal.

3. The device of claim 2 wherein said device is arranged to produce a second output signal at said fourth terminal.

4. The device of claim 2 wherein said second output signal is narrower than said input signal.

5. The device of claim 4 wherein said second output signal is produced by a chopping operation selected from a group of chopping operations including head chopping, tail chopping, and head and tail chopping.

6. The device of claim 1 wherein the first terminal further includes a directing device for directing said first output signal into a second output.

7. The device of claim 6 wherein said first splitting device further includes a fourth terminal, said first terminal further includes a second splitting device, and wherein at least one of said second output and said fourth terminal includes a first combining device for directing part of said input signal from said second splitting device via a first optical path into one of said second output and said fourth terminal.

8. The device of claim 7 wherein said first optical path further includes an optical amplifier.

9. The device of claim 7 wherein said one of said first optical path and said first terminal includes an optical delay line.

10. The device of claim 6 wherein said directing device is selected from a group of devices including circulators, couplers, and directional couplers.

11. The device of claim 1 wherein the first terminal further includes a third splitter and a second combining device, said third splitter and said second combining device being connected via second and third optical paths, and wherein at least one of said second and third optical paths includes an optical delay line and at least one of said second and third optical paths includes an optical amplifier.

12. The device of claim 1 wherein said first output signal is produced by a chopping operation selected from a group of chopping operations including head chopping, tail chopping, and head and tail chopping.

13. The device of claim 1 wherein said at least one non linear element is a solid state amplifier.

14. The device of claim 1 wherein said at least one non linear element is an optical amplifier having controllable gain.

15. An all optical chopping device for shaping and reshaping comprising:
   i. a first splitting device having at least first, second, and third terminals; and
   ii. at least one nonlinear element,
   wherein said second and third terminals form an optical loop including said at least one nonlinear element displaced from the center of said optical loop,
   wherein said splitting device is arranged to receive an input signal from the first terminal for splitting said input signal into optical signal components for propagating clockwise and counterclockwise in said optical loop,
   wherein said optical signal components partially overlap each other at said nonlinear element for producing a first output signal at the first terminal, and
   wherein said first output signal is narrower than said input signal.

16. An all optical chopping device for shaping and reshaping comprising:
   i. a first splitting device having at least first, second, and third terminals;
   ii. at least one nonlinear element; and
   iii. at least one attenuator,
   wherein said second and third terminals form an optical loop including said at least one attenuator and said at least one nonlinear element displaced from the center of said optical loop,
   wherein said first splitting device is arranged to receive an input signal from the first terminal for reflecting a first output signal into the first terminal, and
   wherein said first output signal is narrower than said input signal.

17. The device of claim 16 wherein said first splitting device further includes a fourth terminal.

18. The device of claim 17 wherein said device is arranged to produce a second output signal at said fourth terminal.

19. The device of claim 17 wherein said second output signal is narrower than said input signal.

20. The device of claim 19 wherein said second output signal is produced by a chopping operation selected from a group of chopping operations including head chopping, tail chopping, and head and tail chopping.

21. The device of claim 16 wherein the width of said first output signal is selectable.

22. The device of claim 21 wherein the width of said first output signal is selected by selecting the gain and attenuation of said at least one attenuator and at least one non linear element.

23. The device of claim 16 wherein the first terminal further includes a directing device for directing said first output signal into a second output.

24. The device of claim 23 wherein said splitting device further includes a fourth terminal, said first terminal includes a second splitting device, and wherein at least one of said second output and said fourth terminal includes a first combining device for directing part of said input signal from said second splitter via a first optical path into one of said second output and said fourth terminal.

25. The device of claim 24 wherein said first optical path includes an optical amplifier.

26. The device of claim 24 wherein said one of said first optical path and said first terminal includes an optical delay line.

27. The device of claim 23 wherein said directing device is selected from a group of devices including circulators, couplers, and directional couplers.

28. The device of claim 16 wherein said first output signal is produced by a chopping operation selected from a group of chopping operations including head chopping, tail chopping, and head and tail chopping.

29. The device of claim 16 wherein said non linear element is a solid state amplifier.

30. The device of claim 16 wherein said at least one non linear element is an optical amplifier having controllable gain.

31. The device of claim 16 wherein said at least one attenuator is an optical amplifier having controllable loss.

32. The device of claim 16 wherein the width of said first output signal is selectable.

33. The device of claim 16 wherein the width of said first output signal is selected by selecting the gain and attenuation of said at least one attenuator and at least one non linear element.

34. An all optical chopping device for shaping and reshaping comprising:
   i. a splitting device having at least first, second, and third terminals;
   ii. at least one nonlinear element; and
   iii. at least one attenuator,
   wherein said second and third terminals form an optical loop including said at least one attenuator and said at least one nonlinear element displaced from the center of said optical loop,
   wherein said splitting device is arranged to receive an input signal from the first terminal for splitting said input signal into optical signal components for propagating clockwise and counterclockwise in said optical loop,
   wherein said optical signal components partially overlap each other at said nonlinear element for producing a first output signal at the first terminal, and
   wherein said first output signal is narrower than said input signal.

* * * * *